(12) United States Patent
Lindo et al.

(10) Patent No.: US 7,958,497 B1
(45) Date of Patent: Jun. 7, 2011

(54) STATE SYNCHRONIZATION IN RECORDING AND REPLAYING COMPUTER PROGRAMS

(75) Inventors: Jonathan Lindo, Los Altos, CA (US); Jeffrey Daudel, South San Francisco, CA (US)

(73) Assignee: Replay Solutions, Inc., Redwood City, CA (US)

( * ) Notice: Subject to any disclaimer, the term of this patent is extended or adjusted under 35 U.S.C. 154(b) by 1226 days.

(21) Appl. No.: 11/449,156

(22) Filed: Jun. 7, 2006

(51) Int. Cl.
*G06F 9/44* (2006.01)
*G06F 11/00* (2006.01)

(52) U.S. Cl. ......... 717/128; 717/116; 717/131; 714/799

(58) Field of Classification Search .................. None
See application file for complete search history.

(56) References Cited

U.S. PATENT DOCUMENTS

| | | | |
|---|---|---|---|
| 6,665,249 B2 | 12/2003 | Liew | |
| 6,832,367 B1 | 12/2004 | Choi et al. | |
| 7,316,005 B2 * | 1/2008 | Qadeer et al. | 717/131 |
| 7,516,446 B2 * | 4/2009 | Choi et al. | 717/128 |
| 2003/0212983 A1 | 11/2003 | Tinker | |
| 2006/0288332 A1 * | 12/2006 | Sagar et al. | 717/124 |
| 2010/0131931 A1 * | 5/2010 | Musuvathi et al. | 717/128 |

OTHER PUBLICATIONS

"A 'flight data recorder' for enabling full-system multiprocessor deterministic replay", Xu et al., Jun. 2003, 12 pages, <http://delivery.acm.org/10.1145/860000/859633/p122-xu.pdf>.*

"Efficient and precise datarace detection for multithreaded object-oriented programs", Choi et al., Jun. 2002, pp. 258-269, <http://delivery.acm.org/10.1145/520000/512560/p258-choi.pdf>.*

"Efficient data race and deadlock prevention in concurrent object-oriented programs", Nienaltowski, Oct. 2004, pp. 56-57, <http://delivery.acm.org/10.1145/1030000/1028695/p56-nienaltowski.pdf>.*

Anonymous, "CloverInstr," from online documentation of Cenqua Pty Ltd. Of Australia, downloaded Jul. 16, 2007, dated 1999-2007, www.cenqua.com/clover/doc/cli/cloverinstr.html, 1 page.

Anonymous, "HP WinRunner software Data sheet," from online documentation of Hewlett-Packard Company, downloaded Jul. 16, 2007, dated 2007, 4 pages.

M. Gerndt et al., "Selective Instrumentation and Monitoring," published by Institut fur Informatik, LRR Technische Universitat Munchen, downloaded Jul. 16, 2007, 14 pages.

Anonymous, "IBM Rational Functional Tester," published by IBM Corporation, 2007, downloaded Jul. 16, 2007, 4 pages.

Anonymous, "Testing SOA applications with IBM Rational quality management solutions," published by IBM Corporation, May 2007, downloaded Jul. 16, 2007, 12 pages.

Lindo, Jonathan, et al., "Building a Reusable Replay System", game tech 2004, copyright Replay Solutions, LLC 2004, 12 pages.

Replay Solutions LLC, "Replay Director v 2.0," dated Apr. 12, 2005, 7 pages.

(Continued)

*Primary Examiner* — Thuy Dao
(74) *Attorney, Agent, or Firm* — Hickman Palermo Truong & Becker LLP

(57) ABSTRACT

Recording and replaying computer programs includes state synchronization and thread management techniques that facilitate accurately replaying the recorded execution of a multithreaded application program. State synchronization comprises, during execution of an application program in a computer system, detecting an operation of the application program to write a memory; preventing the operation to write the memory; storing a representation of the memory; permitting the operation to write the memory, resulting in written memory; comparing the written memory to the stored representation; and in response to determining that the written memory is different than the stored representation, generating a notification that a memory state synchronization exception occurred.

27 Claims, 26 Drawing Sheets

OTHER PUBLICATIONS

Replay Solutions LLC, "Replay Director, XBOX User's Guide," located at http://www.replaysolutions.com, revision A, dated May 2005, 12 pages.

Replay Solutions LLC, "Replay Director, User's Guide," located at http://www.replaysolutions.com, revision D, dated Jun. 2004, 10 pages.

King, et al., "Debugging operating systems with time-traveling virtual machines", originally published in the proceedings of the 2005 USENIX Annual Technical Conference, Apr. 2005, 15 pages.

Ronsse et al., "Record/Replay for Nondeterministic Program Executions", ACM Communications, 2003, vol. 46, Part 9, 6 pages.

Ronsse et al., "RecPlay: a fully integrated practical record/ replay system", ACM Transactions on Computer Systems, 1999, vol. 17, Issue 2, 20 pages.

Xu et al., "A Flight Data Recorder for Enabling Full-System Multi-processor Deterministic Replay", 30th Annual International Symposium on Computer Architecture (ISCA-30), Jun. 2003, 12 pages.

* cited by examiner

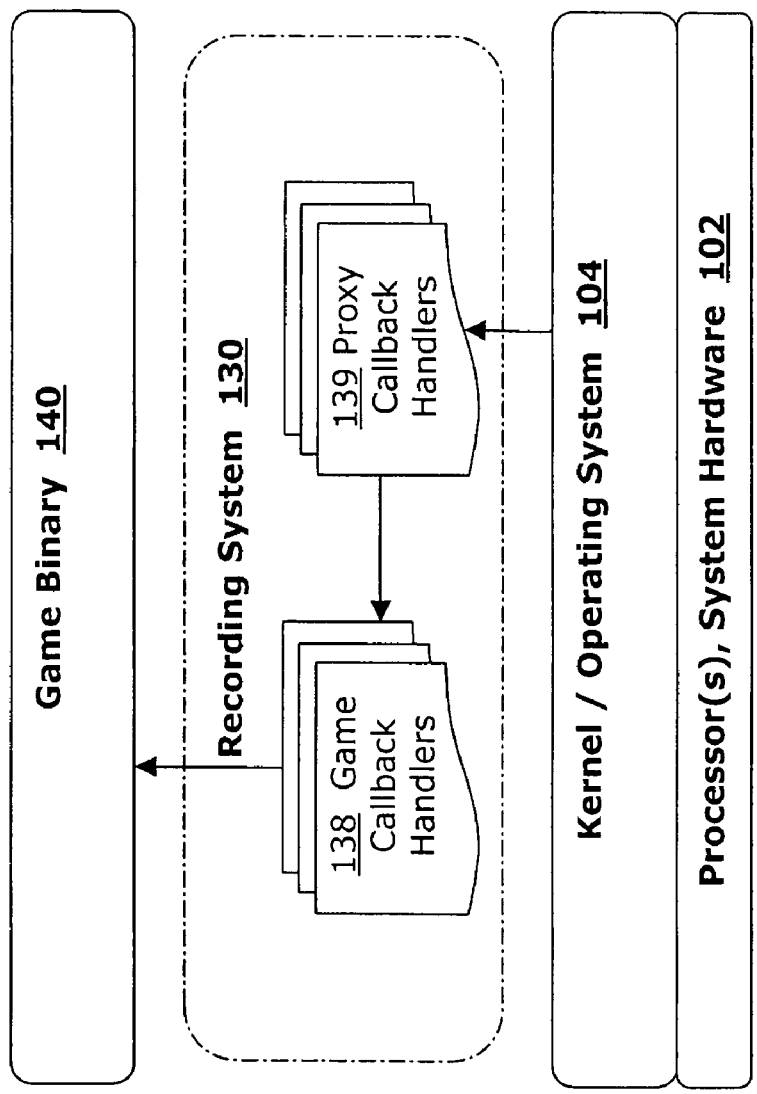

Exception Handler for State Synchronization

State Synchronization - Record Operations

Exception Handler for Detecting Race Conditions

STATE SYNCHRONIZATION IN RECORDING AND REPLAYING COMPUTER PROGRAMS

FIELD OF THE INVENTION

The present invention generally relates to computer software development processes and systems. The invention relates more specifically to memory management and thread management techniques for use in recording and replaying information relating to a computer program as the program is executing.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer software development often involves several progressive phases such as definition, coding, quality assurance (QA) and testing, error removal or "debugging," and maintenance. In commercial software development, testing and debugging often consumes considerable time, and may account for the largest time component in a development project. Traditional bug fixing requires detailed communication between testers and developers. Time is often wasted going back and forth between testers and developers trying to reproduce and isolate problems. Verifying that a bug has been fixed is error-prone and time consuming. Therefore, software developers are continually looking for ways to reduce the amount of time spent on testing and debugging.

One approach is to outsource QA and testing to test personnel in another location, even another country. However, outsourcing can involve language barriers and communication barriers when a developer prepares and sends written bug reports in a local language to QA personnel in another country who speak another language. Distance barriers, and complications arising from having developers and testers in different physical locations or even different time zones also can exist. Developers would like to have a software testing solution that facilitates communication in an outsourced environment.

Scheduling QA testing within the software development cycle can be difficult. Finding and fixing bugs is unpredictable, at best. Delays in QA testing can lead to late releases, missed market windows, and lost revenue. These issues may be acute in the fast-paced environment involved in developing computer games for platforms such as the PC, Microsoft XBOX family, Sony Playstation family, Nintendo, etc.

To address these issues, several types of program execution recording systems have been developed. Generally, program-recording systems record information about a program under test as the program executes, and provide reports about that information. However, consistently reproducing bugs is a serious problem in software development, and achieving it typically involves expending significant resources. Some systems facilitate replaying program execution on a repeated basis. Using these systems, debugging is improved because bugs are reproducible by replaying a particular program execution session.

Types of program recording systems include external I/O recorders, source code instrumenters, and binary patching systems. Generally, external I/O recorders create and store recordings of network I/O operations, user input, and graphics or display 3-D (D3D) information. External I/O recorders may be use to simulate such external input to a program. External I/O recorders do not require any modifications to program code, are robust in response to code and asset changes, and can be used for cross-platform testing and demos. However, external I/O recorders may not produce accurate program replays due to timing issues, such as irregular network delays, or race conditions. Further, external I/O recorders may be unusable with some platforms for security reasons. External I/O recorders do not account for non-determinism in programs associated with thread context switching. External I/O recorders are sometimes termed macro recorders. A commercial example is Mercury Interactive's WinRunner.

Source code instrumenters usually provide proxy API libraries and modules; a developer must include the libraries or modules in source code for testing purposes. Source code instrumenters are somewhat reusable, can be easily expanded and tuned, and recordings may be portable across platforms. However, source code instrumenters are applicable only to modules for which program source code is available; they cannot be used to debug programs for which only executable machine code is available. Source code instrumenters typically require the use of a specialized API for certain calls by the developer, or a code-parsing module. Thus, the developer shoulders the burden of inserting the correct API calls in the source code of the program under test. Further, source code instrumenters provide no support for third-party modules such as dynamic linked libraries (DLLs) or linked executables, because such modules will not contain the required API calls at the time of testing. Source code instrumenters may not provide 100% accurate replays due to the effect of external events that are not trapped and recorded.

Binary patching systems operate by adding specialized recording code to the binary machine code of a program under test after compilation. A commercial example is Rational Purify. Binary patching systems are highly reusable and can produce accurate recordings by capturing detailed operational data. Binary patching systems do not require source code modifications, and can be applied to any executable, library or DLL. When disabled, binary patching systems do not affect program execution or size. Binary patching systems can capture low-level program calls, e.g., calls to hardware elements.

However, binary patching systems can be fragile when code or assets change. A recording of a program of a first version may be incompatible for replay when the program is modified to a later version. Binary patching systems may require special support for certain APIs, such as those relating to networking. Binary patching systems typically require special support for different processors having different machine instruction sets, and for different binary file formats (e.g., PE, XBE, ELF). Binary patching systems do not readily produce recordings that are portable across platforms. Further, cross-module inlining of code (e.g., using Link Time Code Generation (LTCG)) can distort function boundaries and make patching inaccurate.

In addition, known binary patching systems are not capable of recording all sources of non-determinism that may exist in an application.

Based on the foregoing, there is a clear need for an improved way to identify and reproduce bugs in a computer program that is undergoing development, QA or test.

Users in this field would appreciate having a solution that could save money in the process of bringing a product to market and shorten the software development cycle. Users also seek a solution that has little impact on existing software development workflows. For example, users would prefer a solution that does not require developers to use new application programming interfaces (APIs) and that does not impose new requirements on the development process. Users also wish to have solutions that facilitate outsourcing by eliminating the need for detailed bug reports, add predictability to scheduling QA testing, and optimize the QA process.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1C is a block diagram that illustrates a general approach for recording and replaying asynchronous callbacks in the context of the system of FIG. 1B.

DETAILED DESCRIPTION

Figure 1A:
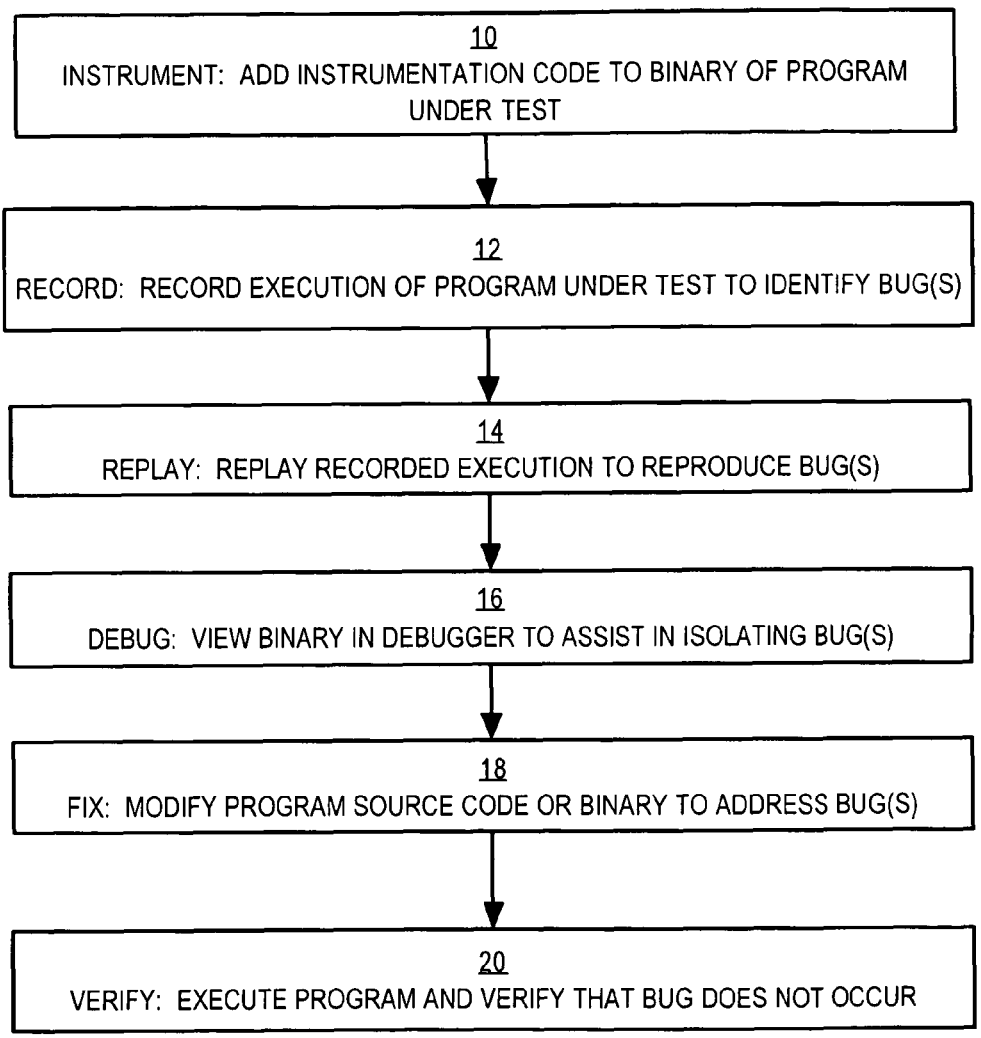
FIG. 1A is a flow diagram of a method of testing a computer program.

A method and apparatus for recording and replaying computer programs is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
3.0 Methods For Recording And Replaying A Computer Program
   3.1 Recording a Replay Stream Representing Program Execution
      3.1.1 Recording Asynchronous Callbacks
      3.1.2 Recording Exceptions
      3.1.3 Recording Thread Context Switches
      3.1.4 Shared Memory Access
      3.1.5 Memory Management
      3.1.6 Efficient Storage of Recorded Replay Data
   3.2 Replaying a Replay Stream
      3.2.1 Replaying on Different Machines
      3.2.2 Fast Forwarding and Skipping State
      3.2.3 Replaying Data Values Read from Non-Initialized Memory
   3.3 Example Replay Stream Data Format
   3.4 Approaches for Applying Instrumentation Code to Program Binaries
4.0 Software Development Management Using Replay System
   4.1 User Interface Example
   4.2 Example Bug Communication Process
   4.3 Other Uses and Benefits
5.0 Memory Management and Thread Management Techniques
   5.1 State Synchronization Techniques
   5.2 Race Condition-Proof Thread Management Techniques
   5.3 Detecting Race Conditions in a Program
   5.4 Detecting Memory Operations
6.0 Implementation Mechanisms—Hardware Overview
7.0 Extensions and Alternatives 1.0 General Overview The needs identified in the foregoing Background, and other needs and objects that will become apparent for the following description, are achieved in the present invention, which comprises, in one aspect, a method is disclosed for detecting state synchronization comprising receiving a memory allocation request from an application program during execution of the application program in a computer system; requesting the computer system to allocate memory; intercepting an operation of the application program to write an allocated memory; storing a representation of the allocated memory; permitting the operation to write the allocated memory, resulting in written memory; comparing the written memory to the stored representation; in response to determining that the written memory is different than the stored representation, generating a notification that a memory state synchronization exception occurred.

In one feature, the method further comprises installing an exception handler that the computer system invokes when a memory write exception occurs, wherein the exception handler performs the storing and permitting. Another feature comprises requesting the computer system to set an allocated memory to allow only read operations.

In another feature, generating a notification comprises generating a notification that a memory state synchronization exception occurred at a point in executing the program associated with the request to write. In various features, the memory comprises any of: static memory in the computer system, and heap memory in the computer system.

In yet another feature, the method further comprises requesting the operating system to permit reading and writing the allocated memory after the storing. In still another feature, the storing further comprises storing a current execution location in association with the representation. In a further feature, generating a notification comprises setting a debugger breakpoint at the point of execution, and invoking a debugger at the debugger breakpoint.

Still another feature involves selecting one or more groups of bytes in the written memory at which the written memory is different than the stored representation, and storing information identifying the groups of bytes in a recording of execution of the program. In a further feature, the method comprises, after the comparing, deleting the representation and requesting the operating system to set the allocated memory for read-only access again.

In one feature, the computer system is a computer game platform. Further, storing a representation of the allocated memory may comprise storing a copy of the allocated memory. Storing a representation of the allocated memory also may comprise storing any of a checksum, hash, message authentication code, and a unique identifier of the allocated memory.

In another aspect, the invention provides a computer-implemented method, comprising during execution of an application program in a computer system, detecting an operation of the application program to write a memory; preventing the operation to write the memory; storing a representation of the memory; permitting the operation to write the memory, resulting in written memory; comparing the written memory to the stored representation; in response to determining that the written memory is different than the stored representation, generating a notification that a memory state synchronization exception occurred.

In other aspects, the invention encompasses a computer apparatus and a computer-readable medium configured to carry out the foregoing steps.

2.0 Structural and Functional Overview

FIG. 1A is a flow diagram of a method of testing a computer program. Generally, the method of FIG. 1A involves steps to instrument, record, replay, debug, fix, and verify. In step 10, Instrument, one or more elements of instrumentation code are added to a binary file representing a program under test. The binary file is an executable version of an application program that needs to be tested, debugged, verified, or otherwise examined. The instrumentation code intercepts or traps certain application operations and records data relating to the operations. Specific approaches for performing binary instrumentation are described further below.

In this description, the terms application, program under test, and binary file refer interchangeably to a user software program that executes instructions. The term operating system or system refers to the low-level software program that a software application interacts with, and which isolates an application from directly interfacing computer hardware in most cases. The term replay system refers to a software program that interacts with both the application and the system and acts an intermediary between the two. It has two modes: record and replay. During record it captures data from non-deterministic function outputs. During replay, it writes the previous data back into nondeterministic function outputs.

In step 12, Record, execution of the program under test is recorded to identify one or more bugs. For example, the program under test is started, and a user interacts with the program according to the normal manner of using the program. Depending on the goals of the user, the user provides input or otherwise manipulates the program until a bug is found by observation of program performance. For example, the program may crash, provide unexpected output, etc.

Recording execution of a program involves programmatically capturing and storing information identifying all sources of non-determinism that may affect the program. Replay stream information is stored in persistent storage and identifies non-deterministic events. Specific approaches for performing recording of non-deterministic events are described further below. Test personnel can attach the stored replay stream information for a portion of a program that contains a bug results to a bug report and send the bug report to a developer.

Many mechanisms may provide non-deterministic input to a program. For example, some known sources of non-determinism include user input, programmatic timers, asynchronous callbacks, thread context switching, direct memory access (DMA) timing, shared memory access, and interrupts. In an embodiment, information identifying all the foregoing non-deterministic sources is recorded and stored as a program executes, and replayed in at Replay step 14.

A source of non-determinism in the form of user input may include input from a keyboard, mouse, joystick, or other device, which varies in timing and in value across different sessions of use of a program.

Non-deterministic input from programmatic timers includes any query to a system clock that a program performs. In the context of game software development, for example, timer queries are commonly used to support simulations of physical movement, changes in on-screen character position in networked games based on timer interpolation or dead reckoning, etc. Further, game code may operate on different execution paths depending on the amount of time that has passed between actions.

Asynchronous callbacks are considered non-deterministic because it is not possible to predict when callbacks will arrive for tasks that a program has "handed off" to an operating system routine or to another program. For example, the operating system may require a different amount of time to perform such tasks depending on network conditions, resource conditions, etc.

Thread context switching is non-deterministic because the time at which a CPU switches from executing one thread to another is not readily predictable, so that the order of operations performed by multiple threads may vary, and therefore the path of execution in code may vary among execution sessions. DMA timing is non-deterministic because the state of system main memory can change between successive program accesses to the memory if system hardware performs intervening DMA accesses. Shared memory access is a source of non-determinism because multiple threads may set values in shared memory at different times without informing the application under test. Interrupt routines are potential sources of non-determinism, and therefore interrupt routines are trapped and replayed.

In step 14, Replay, execution of the program is replayed, by running the program and substituting information from the stored replay stream for all non-deterministic events that are associated with a recorded execution. Specific approaches for performing replay are described further below. The Replay step can be performed by a developer who has received a bug report that contains an attached replay stream recording. Thus, the approaches herein enable the developer to immediately reproduce the bug by replaying the recorded replay stream.

Typically, Replay at step 14 concludes at a point in program execution at which a bug occurs. In step 16, Debug, a debugger program is started and loaded with the program binary. A user can set breakpoints in the debugger at points in the binary that may be close to code containing a bug, modify machine instructions in an attempt to remove the bug, etc., or otherwise use the debugger to solve problems associated with one or more bugs. Step 18, Fix, represents applying such fixes using a debugger, or modifying program source code and recompiling the source code into a new binary executable file. Typically steps 16, 18 are also performed by a developer who has received a bug report with a stored replay stream.

In step 20, Verify, the program is executed again, using the replay stream, to verify that the bug does not occur or has been eliminated. Typically, step 20 is performed by test personnel after receiving communication from developers that a bug has been removed.

The approach of FIG. 1A facilitates an efficient, fast method of detecting and eliminating bugs in computer programs. Redundant cycles in the bug fix workflow are eliminated. There is no need for back-and-forth communication between the tester and the developer to collect additional bug information. The recorded replay stream provides all information that the developer needs to reproduce a bug found by a tester. Verifying removal of a bug is as simple as replaying the recording of the bug to verify that program operation meets expectations.

Figure 1B:
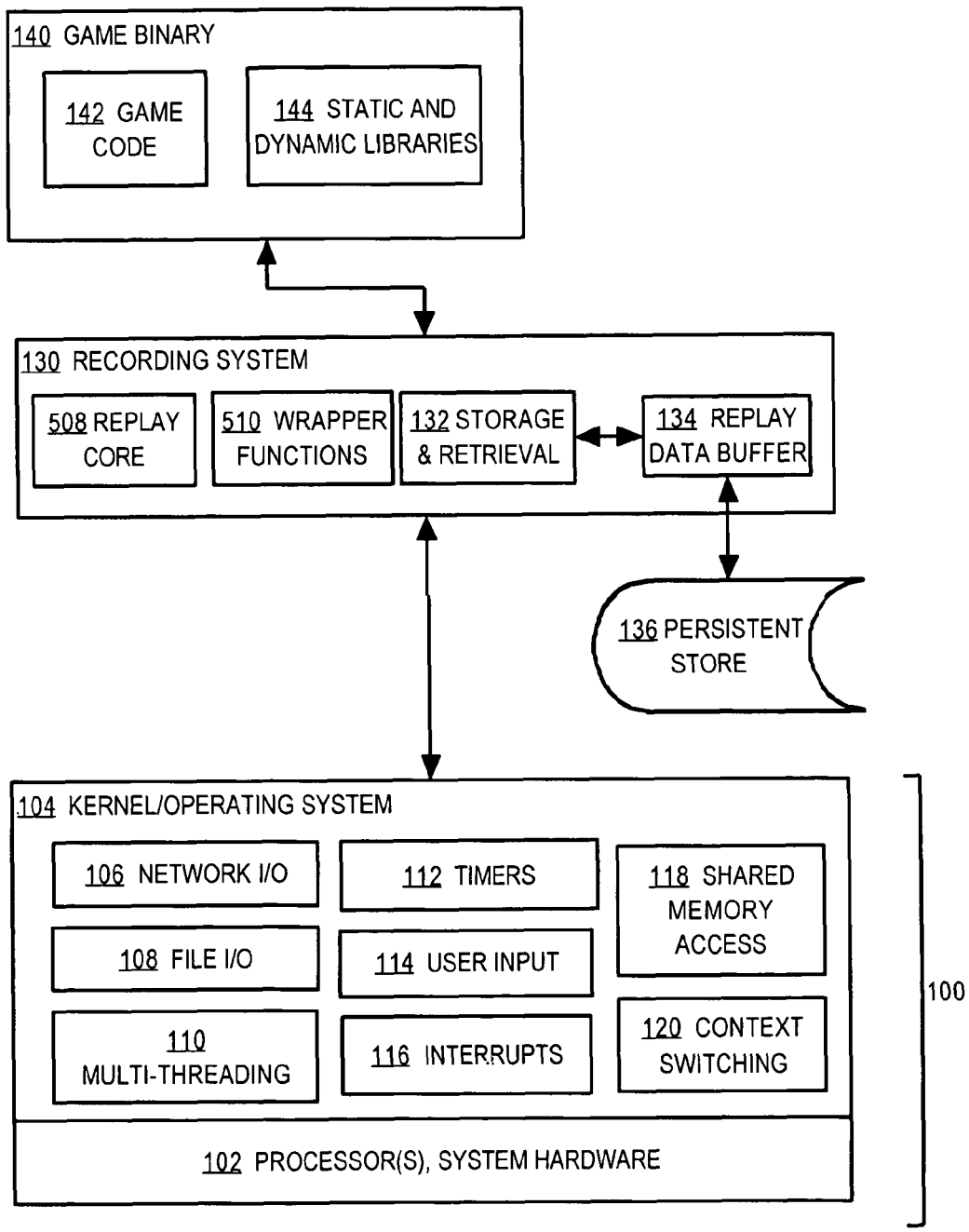
FIG. 1B is a block diagram of a computer system that includes a recording system.

FIG. 1B is a block diagram of a computer system that includes a recording system according to an embodiment. A computer system 100 includes one or more processors and other system hardware such as video graphics electronics, memory, and storage, collectively designated as hardware 102, which hosts an operating system 104. The operating system 104 provides interfaces to hardware 102 for application programs, and supervises and controls the application programs. Thus, in most cases operating system 104 isolates the application from the hardware. In one embodiment, operating system 104 is based upon a kernel element, but a kernel-based OS is not required.

Operating system 104 also includes one or more sources of non-determinism that affect execution of an application program that the operating system supervises. In one embodiment, sources of non-determinism may include a network I/O module 106, file I/O module 108, multi-threading module 110, timers 112, user input 114, interrupts 116, shared memory access 118, and context switching events 120.

A replay system 130 runs on operating system 104. The replay system 130 is configured to programmatically capture and store information identifying all sources of non-determinism that may affect the program, create and store replay stream information in persistent storage and that identifies non-deterministic events, and to replay a program under test while supplying the replay information.

In the example of FIG. 1B, game binary 140 is a program under test, and represents a binary executable version of a game computer program. Game binary 140 comprises game code 142, representing machine code for a game, and one or more static libraries or DLLs 144. Replay system 130 is shown logically between game binary 140 and operating system 104 because, during the Instrument step 10 of FIG. 1A, the recording system modifies the game binary in a way that logically inserts the recording system between the game binary and the operating system. Further, the Record step of FIG. 1A, during execution of game binary 140, replay system 130 intercepts all requests of the game code 142 to use services of operating system 104, such as services of modules 106-120, and the recording system services all such requests instead. In the Replay step 14 of FIG. 1A, replay system 130 provides all information that the services of modules 106-120 actually provided during the first execution and recording.

Replay system 130 also includes replay core 508 and wrapper functions 510, which are described further below with respect to FIG. 5.

3.0 Methods for Recording and Replaying a Computer Program

In this section 3.0, the term "program binary" refers to a binary file containing machine code and libraries for a computer program undergoing test, debugging, or other evaluation.

3.1 Recording a Replay Stream Representing Program Execution 3.1.1 Recording Asynchronous Callbacks According to one embodiment, asynchronous callbacks are recorded and replayed. Callbacks are function calls that the system may make into the application space. In conventional practice, program developers are required to provide a callback handler routine in a program binary for each asynchronous callback that an operating system might send to the program binary. In such cases, the application registers a callback handler with the operating system and specifies an entry the system may use. Example usages of callbacks are system events or notifications, which can be nondeterministic. For example, Microsoft Windows messages and user input events might generate callbacks to the application such as mouse or keyboard events.

Generally, an approach for recording and replaying asynchronous callbacks involves tracking when a callback or exception is made while executing a system call. To perform such tracking, the replay system first intercepts the function calls that register callback handlers. The replay system installs a proxy callback routine so that the system will notify the replay system when a callback occurs and not the application directly. This approach isolates the application from any nondeterministic interaction that can be generated from the system.

FIG. 1C is a block diagram that illustrates a general approach for recording and replaying asynchronous callbacks in the context of the system of FIG. 1B. In an embodiment, tracking asynchronous callbacks includes detecting that game binary 140 is attempting to register one or more game callback handlers 138 with operating system 104, and registering one or more proxy callback handlers 139 with the operating system as substitutes for the game callback handlers. Such installation may use an instrumentation approach that is described further below, resulting in creating a modified game binary that includes the proxy callback handlers within a proxy space of the game binary.

The proxy callback handlers 139 perform asynchronous callback handling on behalf of the game callback handlers 138. For example, system 104 may call the proxy callback handlers 139 with callback or exception events. The replay system 130 intercepts such calls, records callback information as needed, and then calls the game callback handlers 138 with the same callback and exception events.

The recorded information includes a sync point so that a callback can be replayed at the same point in execution that the callback occurred at the time of recording. Sync points represent an order at which a callback occurred, but not necessarily the absolute time at which a callback occurred. In an embodiment, integer values termed sync index values represent sync points. Index values are described further herein with respect to FIG. 7.

Upon re-execution of the program and playback of a replay stream, asynchronous callback events are queued in the proxy callback handlers 139 for delivery to the game binary 140. The callback events are delivered from the queues at the appropriate recorded sync point. This approach may result in the replay system 130 blocking delivery of events until an appropriate point during execution; however, the use of callback delivery queues guarantees that program replay accurately reproduces an earlier recorded execution session. The callback events are delivered from the proxy callback handlers 139 to the game callback handlers 138 in the game binary 140. Thus, during replay, simulated callback events are delivered to the game binary 140 at specific recorded points. This approach can be applied to message callbacks, sound system callbacks, or any other asynchronous input/output.

As an application makes a system function call, the replay system monitors whether the system makes a callback or multiple callbacks during the function call. The replay system records all nondeterministic data that is passed in during each callback to the application. After the data is recorded, the replay system allows the original callback to be received by the application through the original registered callback handler. This approach allows the application to receive the callbacks, as it would do normally without replay.

Figure 2A:
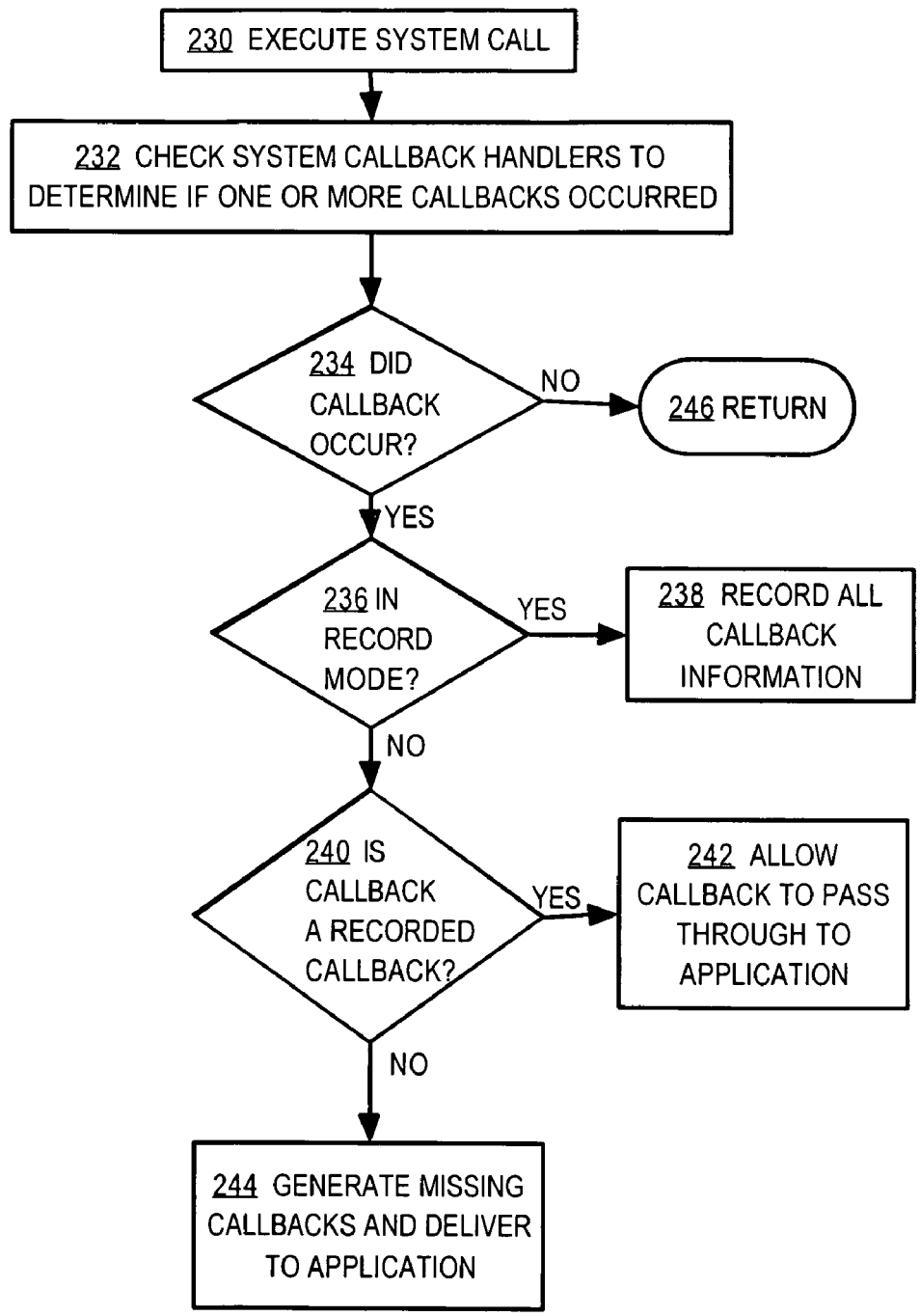
FIG. 2A is a flow diagram illustrating a process of recording and replaying asynchronous callbacks in one embodiment of the foregoing approaches.

FIG. 2A is a flow diagram illustrating a process of recording and replaying asynchronous callbacks in one embodiment of the foregoing approaches.

In step 230, an operating system executes a system call. At step 232, the replay system checks system callback handlers to determine if one or more callbacks occurred. If a callback did not occur, as tested at step 234, then control returns to the replay system for other processing at step 246.

If a callback occurred and the replay system is in record mode, as tested at step 236, then in step 238 all callback information is recorded in a replay stream. If the replay system is not in record mode, then the replay system is in replay mode, and in step 240 the process tests whether the callback is a recorded callback. If so, then in step 242 the replay system allows the callback to pass through to the application. If not, then at step 244 the replay system generates the missing callback and delivers associated output to the application.

As indicated in FIG. 2A, during replay, proxy callbacks are substituted. However, the replay system blocks all callbacks from the system that do not occur at the same time that they occurred during recording. Only callbacks that exactly match the recording are allowed to pass through to the application. For callbacks that do not occur at the same time, the replay system simulates a callback using the recorded non-deterministic. This approach allows the application to receive the exact same callbacks as when recorded.

Notably, replay system 130 can determine whether an asynchronous callback from the system has occurred only when the application calls a non-deterministic system API call such that the replay system acquires control of execution and can make the appropriate decision. When the application is executing instructions other than non-deterministic system calls, the replay system 130 does not affect application execution.

3.1.2 Recording Exceptions

Exceptions are another form of flow control that an operating system may send to an application when a function call is made. Exceptions can be nondeterministic. According to an embodiment, replay system 130 processes exceptions in a similar manner as callbacks. In one embodiment, replay system 130 installs an exception handler for each application function that the replay system intercepts and that makes a function call into the operating system. The exception handler monitors whether an exception is thrown. In record mode, any exception is recorded, and multiple exceptions may be recorded. Once the nondeterministic data is recorded, which often includes all the exception information, the exception is passed on to allow the application to handle the exception normally.

Figure 2B:
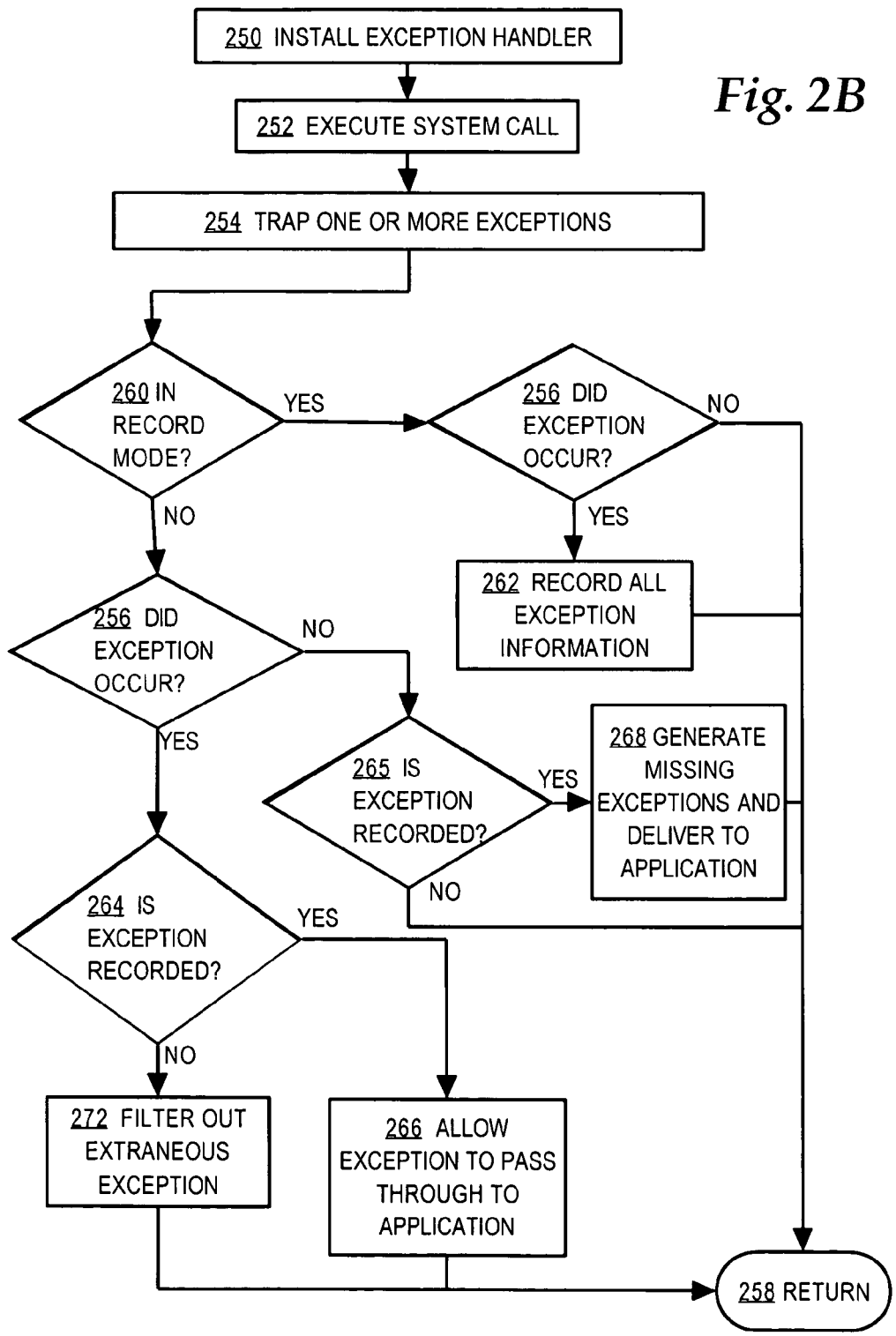
FIG. 2B is a flow diagram illustrating a process of recording and replaying exceptions in one embodiment of the foregoing approaches.

FIG. 2B is a flow diagram illustrating a process of recording and replaying exceptions in one embodiment of the foregoing approaches. In step 250, an exception handler is installed. Step 250 may occur at runtime during either recording or replaying an application. In step 252, a system call is executed. At step 254, one or more exceptions are trapped.

At step 260, a test is performed to determine if the replay system is in record mode. If so, then at step 256, a test is performed to determine if an exception occurred during execution of the system call at step 252. If not, then control returns at step 258. If an exception occurred, then all exception information is recorded in the replay stream at step 262, and control returns at step 258.

If the replay system is in replay mode, then control passes from step 260 to step 256 in which a test is performed to determine if an exception occurred during execution of the system call at step 252. If the exception occurred during replay but was not recorded, as tested at step 265, then in step 268 the missing exception is generated and delivered to the application.

If an exception did occur at step 256 and if the one or more exceptions have been recorded, as tested at step 264, then in step 266 the replay system allows the exceptions to pass through to the application. If an exception occurred at step 256 but no exception is recorded at that point, as tested at step 264, then in step 272 the replay system filters out the extraneous exception and does not pass the exception through.

Thus, during replay, the replay system monitors if the same exact exception is thrown during a function call. If an exception is not thrown, then the replay system can generate a simulated exception using the recorded data from earlier. If an exception is thrown during replay when an exception did not occur on record, the extraneous exception is filtered out and not allowed to pass to the application. Using these techniques, the application will receive the same exception behavior as it did on record.

In one embodiment, some data that the replay system 130 must generate during replay originally contained contextual data during record that was relevant to the application when it was recorded, but will be out of context during replay. For example, exception information may contain memory addresses or window handles that will be different during replay. For these cases, replay system 130 substitutes the original data that was contextual with data that is relevant to the application during replay. To perform such substitution, replay system 130 maps certain memory addresses, window handles, and pointers to other data from what they were during record, to what they are during replay. For example, during record, an application may create a window and the operating system assigns the window a window handle of value 0x5. However, during replay, when the application creates the window, the OS may assign a window handle of value 0x8. Therefore, replay system 130 stores the values and changes 0x5 to 0x8 when appropriate during replay.

3.1.3 Recording Thread Context Switches

According to one embodiment, thread context switches occurring during program execution are recorded and replayed. In this description, "thread context switch" refers to an operation of a data processor when the processor changes attention from one executing program thread to another thread. The order of thread context switching can be important, for example, when data is exchanged between threads. In one embodiment, only thread context switches associated with data exchanges are recorded and replayed. This constraint has been found appropriate because recording all thread context switches would consume an impractical amount of memory.

One embodiment involves identifying methods that are called to share data between threads, and recording only information about the called methods and the sync point at which such calls occurred. Methods that are called to exchange data between threads are termed thread sync points herein. Thread sync points have been found to occur only when an application calls an operating system function that performs resource locking. Thus, examples of thread sync points include methods that result in an operating system locking certain resources, such as Lock, TryLock, and Release methods; methods associated with waiting on or signaling program events, such as Event Wait, EventSignal, WaitForMultipleEvents, WaitForSingleObject; and methods that signal entering or exiting critical sections of executable code, such as EnterCriticalSection and LeaveCriticalSection.

Recording such method calls and associated thread sync points ensures that such methods are called in the same order upon replay. Therefore, an embodiment can ensure that a program binary processes data in the same way upon replay as the data was processed at the time of recording. In particular, the program binary has access to the same resource at the same sequence point, and therefore in the same resource state, at replay as upon recording.

Figure 2C:
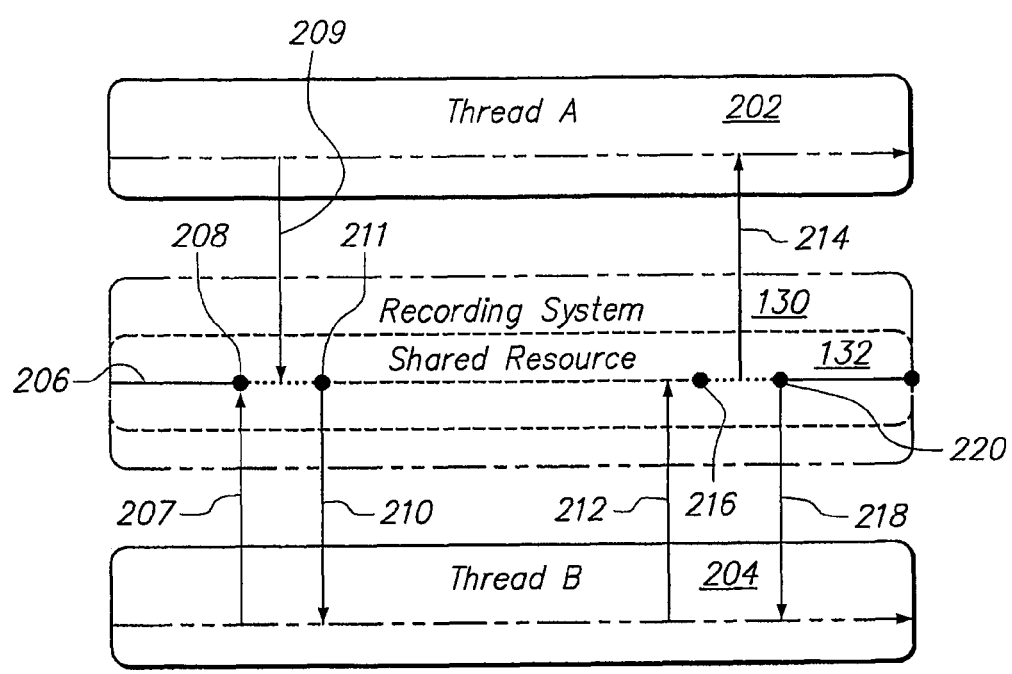
FIG. 2C is a block diagram illustrating how thread context switches are recorded.

FIG. 2C is a block diagram illustrating how thread context switches are recorded. A replay system 130 monitors accesses of a first thread 202 and a second thread 204 to a shared resource 132. Line 206 represents a progression of time from left to right in FIG. 2C.

The second thread 204 issues a resource request 207 and obtains a lock or control of resource 132 at a first sync point 208, which replay system 130 records. First thread 202 then issues a resource request 209 to acquire a lock for the same resource. Although resource request 209 may require a processor to switch context from second thread 204 to first thread 202, any such switch is necessarily temporary because the processor cannot give control of the resource 132 to the first thread when the second thread is holding control. The processor places the first thread 202 in a queue identifying threads that want the resource. Therefore, replay system 130 does not record a context switch at the time of request 209.

Second thread 204 then issues a resource release 210 for the shared resource 132, allowing the processor to dequeue first thread 202 and give the first thread control. Therefore, replay system 130 records a second sync point 211 reflecting a change in control of the resource 132. Second thread 204 later issues a resource request 212 for the resource 132, but the processor cannot grant control of the resource to the second thread. Therefore, recording system does not record a context switch at that point.

First thread 202 issues a resource release 214, and in response the replay system 130 records a context switch at a third sync point 216, because second thread 204 gains control of the resource. Second thread 204 issues a resource release 218 at a fourth sync point 220, which is recorded.

Figure 10:
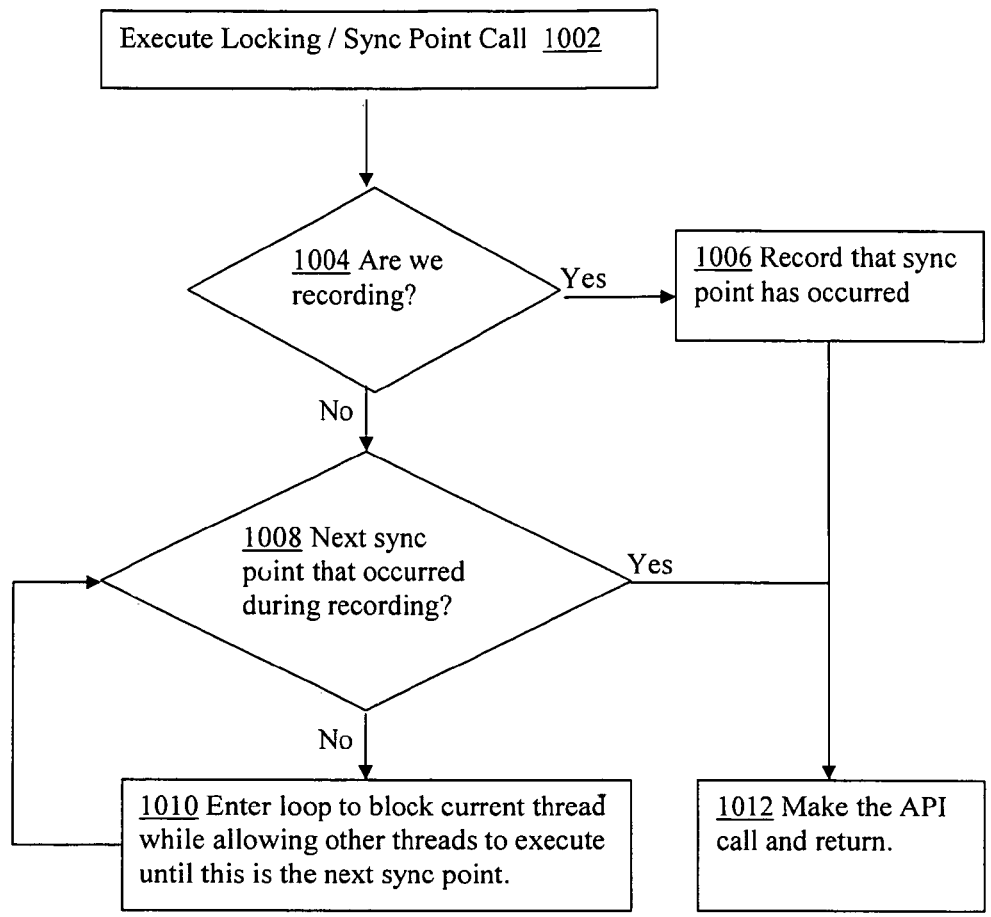
FIG. 10 is a flow diagram of a method of processing program calls that relate to thread context switching.

In one embodiment, during replay, the replay system 130 monitors application execution and intercepts each application call to an operating system function that involves resource locking or release. FIG. 10 is a flow diagram of a method of processing program calls that relate to thread context switching. In step 1002, a program binary attempts to execute a resource locking or other call at a sync point. Replay system 130 intercepts the call. If recording is occurring, as tested at step 1004, then in step 1006 the current sync point is recorded, and at step 1012 the replay system makes the operating system API call on behalf of the program binary. If recording is not occurring, then control transfers to step 1008, which tests whether the next sync point that occurred during recording has arrived. If the next sync point has arrived, then in step 1012 the OS API call is made. If not, then in step 1010 a loop is entered that blocks the current thread while allowing other threads to execute until the next recorded sync point occurs.

Thus, replay system 130 determines the then-current sync point at which such a call occurred, and compares the current sync point to a replay sync point for the next call represented in the recorded replay stream data. If a match occurs, then the replay system 130 allows the call to pass through to the operating system. If no match occurs, replay system 130 blocks the call and enqueues the call in a waiting queue until the correct sync point arrives. A call is allowed to proceed only at the correct sequence point. This approach ensures that a particular thread only receives a lock on a resource at the same order in execution on replay that the thread received the lock when execution was recorded.

Notably, replay system 130 can determine whether a resource lock or release should occur only when the application calls a non-deterministic system API call such that the replay system acquires control of execution and can make the appropriate decision. When the application is executing instructions other than non-deterministic system calls, the replay system 130 does not affect application execution.

Thus, the approach herein focuses on recording a sequence of resource locks that occur for a shared resource, rather than the particular time at which locks and releases occurred. By recording information about lock methods and releases, and the sequential sync points at which locks and releases occurred, replay system 130 can accurately replay the order of program execution.

3.1.4 Shared Memory Access

According to one embodiment, accesses of application processes to shared memory are monitored using a recording system API. Thus, developers who are preparing source code of programs under test include calls to an API associated with replay system 130 whenever access to shared memory is needed. Adding the API calls to program source enables replay system 130 to monitor shared memory accesses at runtime when a program binary based on the program source is compiled and run.

3.1.5 Memory Management

In one embodiment, replay system 130 includes mechanisms for accurately replicating the contents of main memory of a hardware system on which the program binary runs when execution is recorded and replayed. Accurate memory replication provides accurate reproduction of memory leaks, for example, if memory leaks exist as a result of program operation. Accessing un-initialized memory may result in very non-deterministic behavior from an application. The application may crash, or make logic decisions based on bad data. Reproducing this behavior is difficult because the state of un-initialized memory is non-deterministic. Further, in the context of developing game systems, accurate memory replication enables replay system 130 to reproduce any code that has data sorted by pointers. Typically, in game systems a game engine's main loop involves iterating over game objects that are sorted by their memory address.

In an embodiment, replay system 130 establishes a private, controlled memory heap that is used to satisfy all requests for memory allocation that the program binary issues. Replay system 130 intercepts all memory requests that the program binary issues to the operating system, and redirects such requests to the private memory heap. Examples of memory request operations include HeapAlloc, VirtualAlloc, etc. The foregoing approach isolates memory requests and prevents non-deterministic system calls from making memory allocations "under the hood" or without informing the program binary.

Further, in an embodiment, replay system 130 tracks all memory allocation requests that an operating system or hardware platform requests a program binary to issue during execution. For example, in the context of game development, certain game console systems may request a program binary to provide and manage memory. A specific example is the XMemAlloc call on the Microsoft XBOX platform. Replay system 130 records information identifying all such requests as part of a replay stream, and upon replay, the recording system simulates such requests. The requests are satisfied using a dummy memory heap, but processing such requests insures that the game heap is preserved.

3.1.6 Efficient Storage of Replay Data

In one embodiment, replay system 130 implements mechanisms providing efficient storage of replay data representing an execution session of a program binary. According to a first mechanism, only non-deterministic function calls are recorded. Most function calls that a program binary issues are deterministic in nature, and there is no need to record them, because issuing the same calls at replay time necessarily causes the same result in program output or state change.

According to another mechanism, program binaries that issue a rapid succession of clock sampling calls are subject to sample throttling upon recording. In sample throttling, replay system 130 records only a specified maximum number of clock sampling calls within a particular time interval, rather than the actual number of such calls that the application issues. This approach appropriately reduces the number of clock sampling calls in a replay recording, based on the recognition that there is often no need for a program binary to access a time value more than a few times per second or, in the context of game development, each time the video buffer is drawn to the screen (e.g., each frame). Additionally or alternatively, sample throttling is activated only in response to specified user input or in response to a configuration command. Therefore, for certain purposes sample throttling can be turned off. High-performance profiling is an example application in which turning off sample throttling may be beneficial.

As another efficiency mechanism, in an embodiment, replay system 130 buffers replay data as the data recorded using a replay data buffer 134 (FIG. 1A), and flushes the replay data buffer to persistent storage 136 only when necessary. Replay data buffer 134 is maintained in main memory of the platform that is running the program binary, and persistent storage 136 is any non-volatile storage media such as disk, flash memory, etc.

In one embodiment, replay system 130 buffers replay data in replay data buffer 134, and flushes the replay data buffer to persistent storage 136 in response to expiration of a periodic timer or in response to a critical event. For example, exceptions or an exit of the program binary may trigger flushing replay data to persistent storage. In an embodiment, the instrumentation step of FIG. 1A involves installing one or more exception handlers or filters of replay system 130 that intercept exceptions and exit events into the program binary. Thus, when a program crash, bug, or other exception arises, replay system 130 is notified and can respond by flushing the contents of a replay data buffer to disk. This approach ensures that replay data is stored when the replay system 130 is used to test an unstable application.

A replay system 130 that implements such efficiency approaches has been found to generate replay data of about 300 kilobytes per minute of program binary execution for a game program. Network-based game programs with simultaneous players may generate more storage. The amount of replay data generated and stored may vary from program to program.

Because replay data is generated efficiently and the resulting replay data files are small, after recording, replay data may be stored using a document control system or code control system that requires checking data in and out as a control measure; replay data can be stored in such a system with a bug report, for the purpose of communicating bugs among developers and quality assurance personnel.

3.2 Replaying a Replay Stream 3.2.1 Replaying on Different Machines

The approaches herein recognize that a recording of program execution is associated with a hardware configuration of a platform that is running a program under test, and that replaying the recording on different hardware may cause inaccurate replay or errors. For example, a recording that includes non-deterministic input from a particular hardware device may be non-reproducible when a user attempts to play back the recording on another system that does not have that hardware device. Therefore, the approaches herein provide a way to account for hardware configuration differences when a recording is replayed on a different machine. The approaches herein also provide ways for synchronizing information describing hardware assets and source code versions in a dynamic, ongoing development environment.

Figure 3:
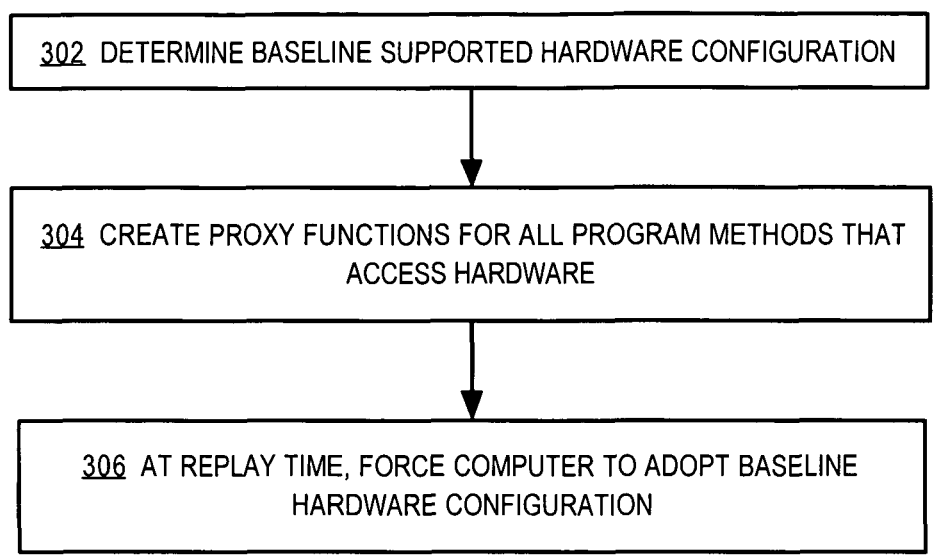
FIG. 3 is a flow diagram of a method for replaying, on a computer having a first hardware configuration, a recording of program execution that was made on a computer having a second hardware configuration.

FIG. 3 is a flow diagram of a method for replaying, on a computer having a first hardware configuration, a recording of program execution that was made on a computer having a second hardware configuration. In step 302, a baseline hardware configuration is determined. For example, a program developer determines a minimum hardware configuration that a particular program under test can support while adequately testing or debugging features of the program.

In step 304, proxy functions are created in the replay system 130. Each of the proxy functions is associated with a program method that accesses or queries a particular specialized hardware feature not found in the baseline platform. For example, one proxy function might intercept program accesses to a graphics-processing unit or to a sound processor that is not part of the baseline configuration.

Upon playback, the proxy function supplies a graceful response to a query to that hardware feature. Thus, in step 306, when a recording is replayed, the program under test is forced to use the baseline hardware configuration that was established in step 302, by interacting with the proxy functions rather than the actual hardware elements that are not available in the baseline hardware configuration. Therefore, a program execution session that was recorded on one machine can be replayed on another, different machine having a different hardware configuration.

In an embodiment, step 306 is optional and is activated in response to a user activating a specified configuration option.

In another embodiment, when a program execution session is recorded, the recording is stored with information identifying changeable assets that the session accessed and version information for the program and for the assets. Examples of changeable assets include data files, configuration files, graphics files, sound files, and other elements that a user or program could modify independent of modifying the program binary.

In an embodiment, the instrumentation step of FIG. 1A installs one or more file I/O proxy functions that intercept and record accesses to the file assets, record what file was accessed, record a version value associated with the file, etc. Using this approach, a complete audit trail is maintained of changeable assets that were used in generating a particular recording.

When the same recording is replayed later, the changeable assets or code are loaded into memory so that they are available for interaction with the program execution session as it is replayed. If a particular asset is not available, not the same version, or otherwise changed at the time of replay as compared to the state of the asset at recording, then replay system 130 issues a warning message or throws an error so that the user is informed that replay execution may not accurately reproduce the same execution session as at recording. In an embodiment, an asset that was accessed from local disk at the time of recording can be accessed from a network location at replay time.

The preceding approach may be implemented using a storage and retrieval module 132 (FIG. 1A) that is integrated into or accessible to replay system 130. Information about accessed assets may be stored on a local machine, local network storage, remote storage, etc.

In an alternative embodiment, a copy of the actual changeable assets is recorded in association with a replay data stream. However, this alternative requires considerably more storage. This alternative may be implemented by receiving user input specifying an execution option for replay system 130, such as in a configuration file, with which a user may specify one or more content files or other assets that are actually recorded as part of the replay data stream.

3.2.2 Fast Forwarding and Skipping State

In an embodiment, upon replay, any program execution function that does not affect the internal state of a program binary can be skipped, for example, in response to user input requesting a skip function or in response to selection of a particular user input device. Examples of program execution functions that do not affect state include any function that provides only output. In the context of a program binary that provides a game, the operation of video screen drawing functions can be skipped. Thus, a user can elect to skip program execution that only involves drawing a complicated video image or series of images. This may enable the user to save a substantial amount of time in replaying a long execution recording.

In an embodiment, a user can skip ahead to a particular point in an execution session by providing user input indicating a request to skip ahead. For example, in one embodiment, replay system 130 periodically stores checkpoint data representing values of all program state values at a particular instant in time and all system state values at the same instant. The checkpoint data essentially represents a snapshot of application state at a particular point in time, and is stored in the replay data stream with information indicating the sync point or time associated with the state. State information may be stored as part of a replay stream or independently. In an embodiment, such periodic checkpointing occurs at regular specified intervals in a recording session, e.g., every five (5) seconds. Any specified interval period may be used.

In one embodiment, the state checkpoint data is created and stored after a complete application execution session has been recorded and replay stream data has been stored. Thus, replay system 130 may replay, scan or review an existing set of replay stream data and create and store state checkpoint data based on determining how values change upon replay. This approach has the advantage of not interrupting application recording to perform the time-consuming step of creating and storing the state checkpoint data. Alternatively, replay system 130 can create and store state checkpoint data during recording a program execution session.

Thereafter, at the time of replaying a recording, a user can provide user input indicating a request to skip to the next state checkpoint or sync point. In response, replay system 130 determines which checkpoint is next, loads all state values for the program binary and the hardware system, sets the state values in the program binary and hardware system under test, and commences continued program execution. In a game system, the user experiences a sudden jump ahead in program execution and the appearance of the video display.

Functions for capturing application state and moving to a particular application sync point or time may be implemented an API that an application can access. State checkpoint data may be stored in a replay state file comprising a plurality of type-value pairs that represent program or system variable types and associated values.

3.2.3 Replaying Data Values Read from Non-Initialized Memory

When an application initiates operation, the state of main memory is often unknown. For example, unless the application or an operating system implements some form of memory initialization that sets all memory locations to a particular value, the application cannot assume that memory contains any particular value. According to an embodiment, replay system 130 can replay data values that are accessed from memory having an unknown state at program startup.

Generally, an application must request an allocation of memory that it needs to read or write from a system kernel that implements protected memory. The amount of memory may be large, spanning gigabytes or beyond terabytes. Therefore, recording the contents of such data, as the contents existed at the time of an application execution session, is impractical. In an embodiment, replay system 130 intercepts all such requests. Each time a new address space is first requested, the replay system initializes values in the address space to deterministic values using pseudo-random value generation before allowing the application access to the memory. Later, upon playback, before responding to an address space request, the replay system initializes the requested memory with the same values.

In another embodiment, replay system 130 can simulate a startup system state in which memory contains random, non-initialized data. Such simulation is useful to prevent the replay system 130 from introducing changes in system condition that could affect program execution or performance. Thus, such simulation prevents the replay system 130 from masking problems that may exist when the replay system is not installed or used. Further, the amount of data required to generate the same memory pattern is small, so that recorded replay stream files remain small. Having to record a gigabyte of data from non-initialized memory to replay a requested gigabyte of data is not considered practical in many cases.

Figure 6:
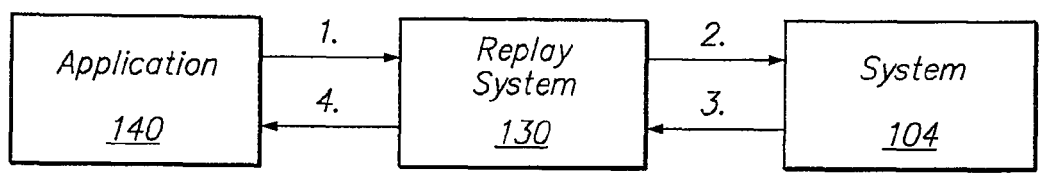
FIG. 6 is a block diagram of an approach for processing application requests for values from non-initialized memory.

FIG. 6 is a block diagram of an approach for processing application requests for values from non-initialized memory. At step 1 of FIG. 6, an application 140 requests values from memory from replay system 130. The replay system 130 intercepts the request, and at step 2 the replay system requests the same memory values from the system 104. The system 104 returns the contents of the requested memory to the replay system 130 at step 3. At step 4, the replay system 130 initializes the memory and returns the memory contents to the application.

According to an embodiment, replay system 130 uses a random seed value and pseudo-random function at step 4 of FIG. 6 to generate an unlimited amount of reproducible simulated memory values. Common program values, such as all unset and set on integer values, are simulated in this approach, and other random values may be simulated. For example, a 32-bit random seed may be generated and recorded as part of the replay stream file. At replay time, the recorded random seed value is retrieved and fed as input to a deterministic pseudo-random function.

The function may be used to generate gigabytes of pseudo-random data that is consistently reproducible whenever the replay stream file is replayed. Because the pseudo-random function is deterministic, the output data is consistent from record to replay. Further, the output data also provides a good approximation of a set of non-initialized data. Moreover, the recorded replay stream file needs to contain only the seed value, not the entire set of generated data; as a result, the technique herein is highly efficient in terms of storage.

In one embodiment, the pseudo-random number generator as defined in a standard operating system library is used to select a random sequence of values that are weighted appropriately.

In another embodiment, each address value is initialized only once. If an application requests the same address value, and then later frees and requests it again, the replay system does not have to reinitialize the address value, since the application will have left the address in a deterministic state.

In one approach, two variables in the replay system track the lowest and highest address values that the application has requested. Each time the application issues a request that is less than the lowest value or greater than the highest value, the variables are updated accordingly. When a memory request is made for an address that lies completely inside the two variables, no new initialization is needed, and the replay system performs no further interaction with the requested memory.

3.3 Example Replay Stream Data Format

Figure 7:
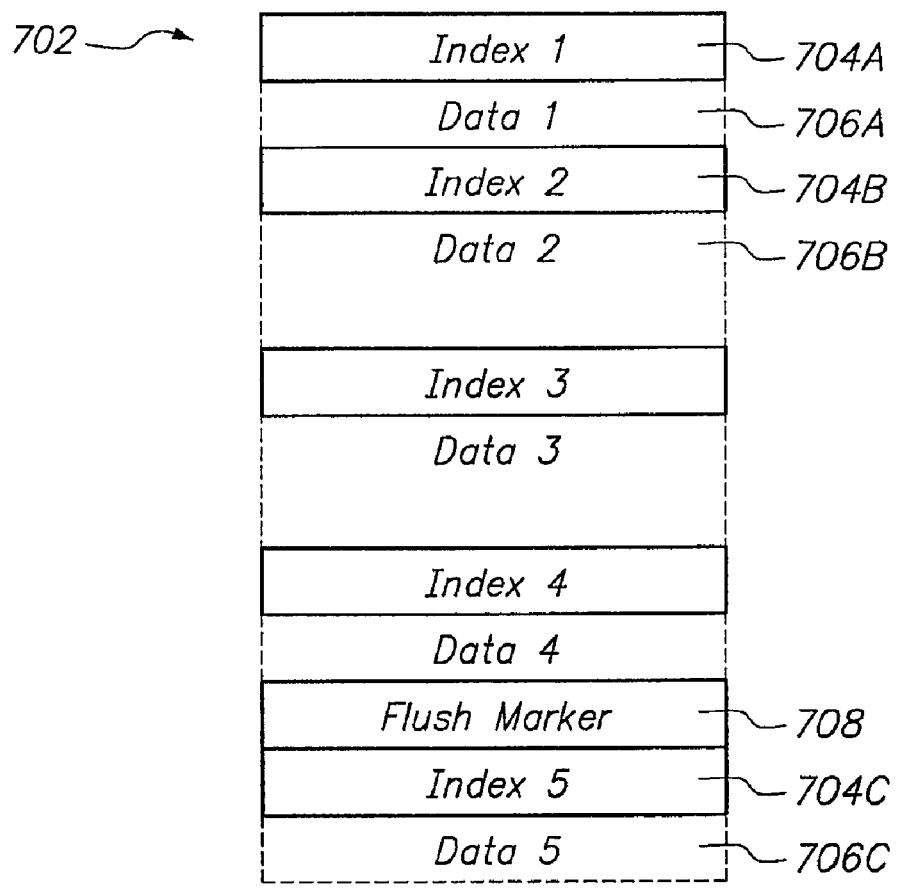
FIG. 7 is a block diagram of an example data format that can be used for storing replay data that is generated as part of recording program execution using the foregoing techniques.

FIG. 7 is a block diagram of an example data format that can be used for storing replay data that is generated as part of recording program execution using the foregoing techniques. In one embodiment, a replay data stream 702 or replay stream file comprises a plurality of index elements 704A, 704B, 704C, etc., a plurality of data elements 706A, 706B, 706C, etc., each corresponding to an index element, and one or more flush marker elements 708.

In an embodiment, index elements 704A, 704B, 704C, etc., and flush marker elements 708 are fixed size. Each of the data elements 706A, 706B, 706C, etc., is variable in size. Each of the index elements 704A, 704B, 704C relates to the sequence of nondeterministic data that is recorded in the stream. Each data element 706A, 706B, 706C has a unique index 704A, 704B, 704C associated with it. Index elements 704A, 704B, 704C typically are sequenced and carry values that increment by one linearly for each data element 706A, 706B, 706C that is recorded. The index elements 704A, 704B, 704C are used during replay mode for verification that an application is executing in the same fashion as it did during Record mode.

Each data element 706A, 706B, 706C relates to a nondeterministic event that occurred during recording. During record mode, data in a data element is collected and written to the replay data stream 702 with an index value. During replay mode, a data element is read from the replay data stream 702 and the data element provides the output of a nondeterministic event back to an application.

The flush marker element 708 indicates a point at which information was written to the replay data stream 702. The flush marker element 708 is used for verification that program execution is the same during replay mode as it was during record mode.

3.4 Approaches for Applying Instrumentation Code to Program Binaries

Generally, applying instrumentation code to a program binary involves changing instructions in the program binary by moving the instructions or redirecting certain instructions to other locations. Some instrumentation may involve modifying relocation tables or segment headers. Instructions are disassembled and instructions associated with non-deterministic input or events are recognized and modified.

Techniques for replacing assembly instructions in-place within an application are now described. In general, replacing assembly instructions as party instrumentation involves how to replace a specific binary instruction while preserving the position and order of all the code surrounding the replaced instruction.

Figure 4A:
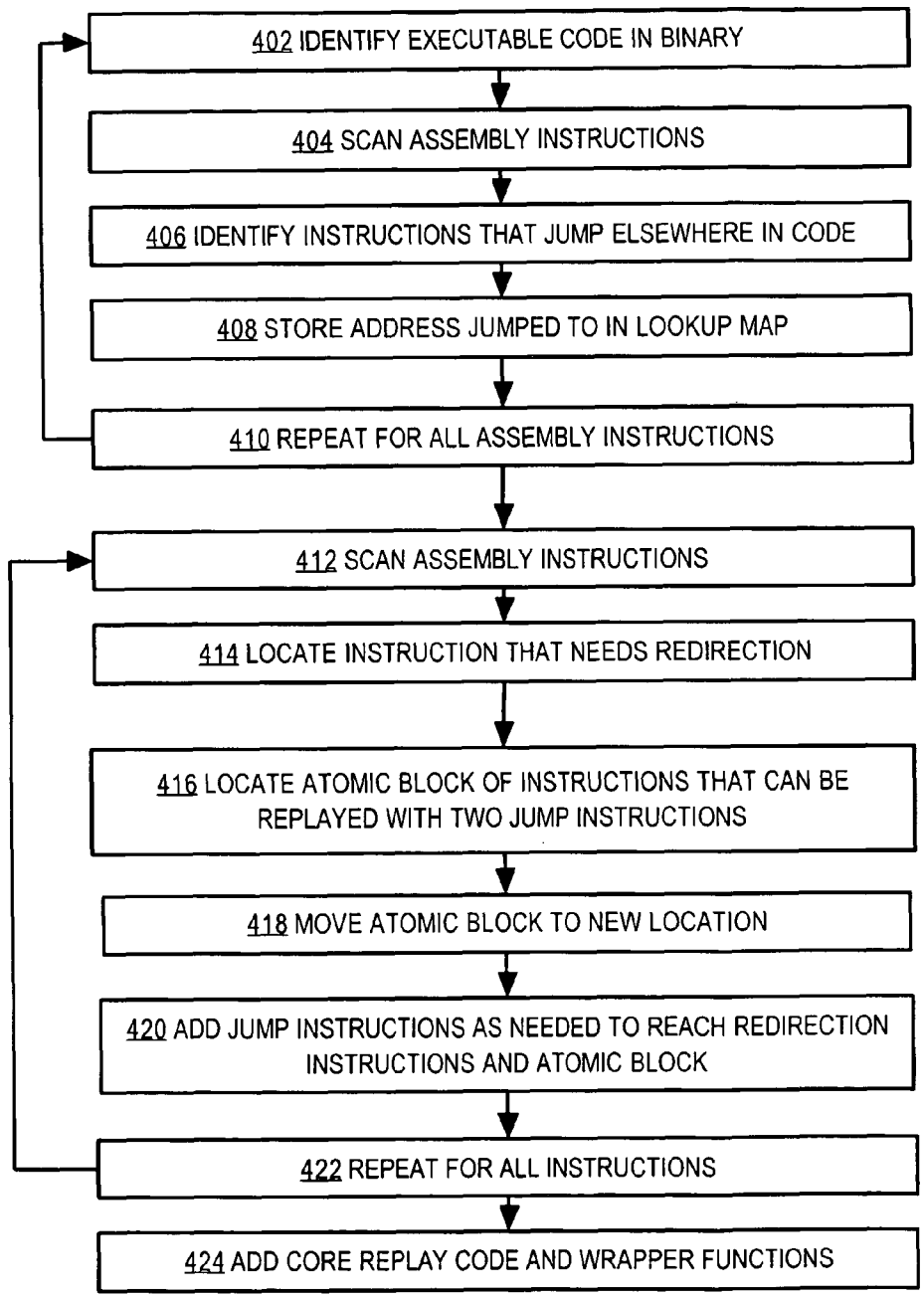
FIG. 4A is a flow diagram of a process of adding replay redirection instrumentation to binary code.

FIG. 4A is a flow diagram of a process of adding replay redirection instrumentation to binary code. In step 402, the executable code in the binary file is identified. A binary file comprises one or more sections, each comprising executable code, data or both. Code comprises binary instructions, which can be disassembled into assembly instructions. Generally, binary instructions in the binary file correspond one-to-one to assembly instructions. Disassembly results in generating a view of the binary file as a linear list of assembly instructions, which may include any instruction that a particular processor can execute. Examples of assembly instructions include MOV, JMP, ADD, etc.

Binary files prepared for different hardware and software platforms may conform to different binary file formats. The description herein assumes that the file format of a particular binary file is known and that a developer has available a software tool that locates and identifies the sections in the binary that contain executable code rather than data. When the executable code has been identified, two passes can be used to introduce redirections in the code that are used as part of the replay system.

Step 404 to step 410, inclusive, represent a first pass that iterates over each assembly instruction looking for instructions that jump into different areas of other code. On a binary file containing instructions conforming to the Intel x86 instruction set, pertinent jump instructions include unconditional jumps and conditional jumps. Each address that is jumped to is stored in a lookup map, which will be used later during a second pass.

In step 404, assembly instructions are scanned. In step 406, the process identifies instructions that jump elsewhere in the code, such as conditional or unconditional jumps. In step 408, each address that is jumped to is stored in a lookup table for later use. In step 410, the process repeats steps 404-408 for all other assembly instructions that are found in the binary file.

Step 412 to step 422 inclusive represent a second pass over the binary file. In step 412, each assembly instruction in the binary file is scanned. In step 414, the process locates an instruction that needs redirection; instructions that do not need redirection are skipped. In one embodiment, instructions that have nondeterministic outputs are selected for redirection into the replay system so that the replay system can record the outputs in record mode, and set the outputs in replay mode. As a specific example, the RDTSC instruction on the x86 processor sets the EAX and EDX registers to nondeterministic values. The replay system can record the values of the EAX and EDX registers and replay the values of the registers when appropriate.

In step 416, the process locates an atomic block of instructions that the replay system can replay with two jump instructions. In this context, an atomic block of instructions is a linear set of instructions that are always executed together in the same order. No other instructions jump into the middle of atomic block, or jump out of an atomic block. An atomic block can be moved to a different address space without causing execution problems or side effects that may change the nature of the program. When looking for a candidate atomic block, the jump lookup table that was constructed in the first pass (e.g., step 408) is used to ensure that no other instructions are jumping into the atomic block.

Figure 4B:
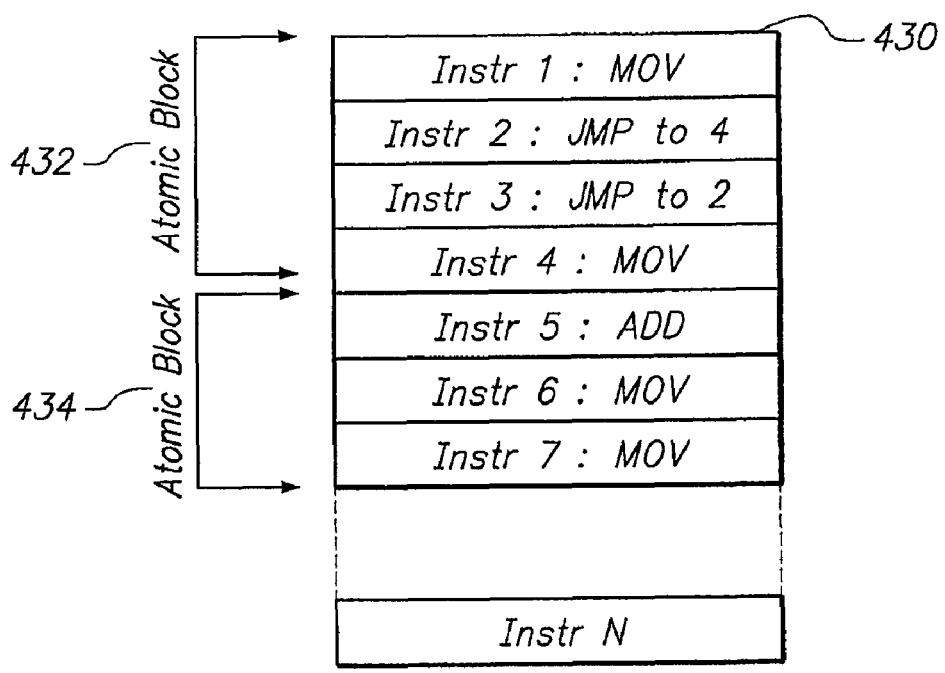
FIG. 4B is a block diagram that illustrates identifying atomic blocks.

FIG. 4B is a block diagram that illustrates identifying atomic blocks. A code segment 430 comprises a plurality of machine instructions denoted Instr 1 through Instr N. A first atomic block 432 comprises instructions Instr 1 through Instr 4, and is considered an atomic block because it contains no jump instructions that jump outside the block, and no other instruction jumps into the atomic block. Similarly, a second block 434 is an atomic block.

In step 416, the atomic block is moved to a new location so that redirection code can be substituted in the binary file at the original location of the atomic block. In an embodiment, an atomic block must be reachable by a small jump statement having a size equal to or less than the size of the instruction that needs to be replaced and redirected.

For example, if the instruction to be replaced and redirected is a two-byte instruction, then that instruction can be moved a maximum of 128 bytes forward or backwards in the code. In that case, at step 414 the process scans the code in both directions and finds the first available atomic block that is reachable and large enough to hold two large jump statements. Two large jump statements are needed to jump into a proxy space associated with the redirection system, because the proxy space may be much further away in the instruction space than 128 bytes. A small jump instruction cannot be used since there might not be enough room to add proxy code.

At step 418, additional jump instructions are introduced into the code as needed to reach new code in a proxy space and to reach the atomic block that was moved at step 416. At step 420, new code is added in the proxy space to redirect nondeterministic functions or output to the replay system.

Figure 4C:
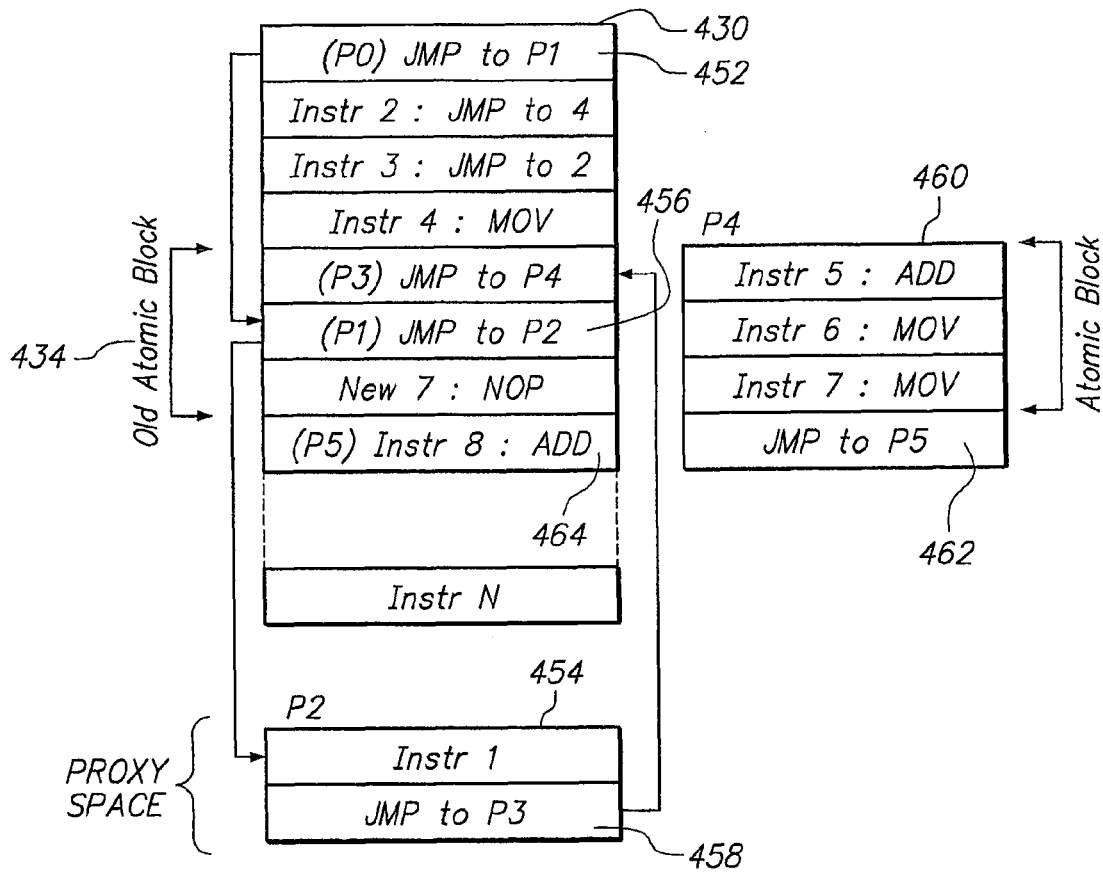
FIG. 4C is a block diagram that illustrates moving an atomic block and inserting redirection code.

FIG. 4C is a block diagram that illustrates moving an atomic block and inserting redirection code. Assume that step 414 of FIG. 4A determines that the instruction Instr 1 of FIG. 4B requires redirection and therefore needs to be moved. Instr 1 is moved to instruction location 454 within a proxy space. A substitute jump instruction P0 replaces Instr 1 at its former location 452 in code segment 430. Instruction P0 provides a jump of 128 bytes or less to instruction P1 at location 456. Execution of P0 causes a processor to transfer control to P1. Instruction P1 is a large jump instruction that can jump into the new replaced code at location 454 in proxy space. The proxy space may contain any amount of code that is necessary for the replay system to record values at that location in program execution.

The new code at location 454 ends at a jump instruction of location 458 that jumps to instruction P3. Instructions P1 and P3 have been inserted in space formerly occupied by atomic block 434, which has been relocated to location 460. Thus, when the proxy space code is executed control transfers to a location after the original position of the replaced instruction. This approach allows the replay system to execute the new replaced instructions.

When location 460 is reached, instructions Instr 5, Instr 6, Instr 7 of the atomic block are executed. The atomic block 434 terminates at a new jump instruction 462 that transfers control back to the end of the original code, at location 464. Execution continues at that point. This approach preserves the original instructions that were displaced from the atomic block. Atomic blocks of instructions may be moved to a different location, and new instructions are inserted, to be executed in place of the atomic blocks. The foregoing approach can redirect any instruction of any length, which is important for processor instruction sets that include variable length instructions. Further, the approach can configure the code to execute any amount of new code upon redirection to the proxy space. The foregoing approach also maintains the integrity of all original instructions of an application.

At step 422, the process of step 412 to step 420 is repeated for all instructions.

At step 424, the process adds core replay code and wrapper functions to the binary file. The core replay code and wrapper functions implement record and replay functions of the replay system.

Figure 5:
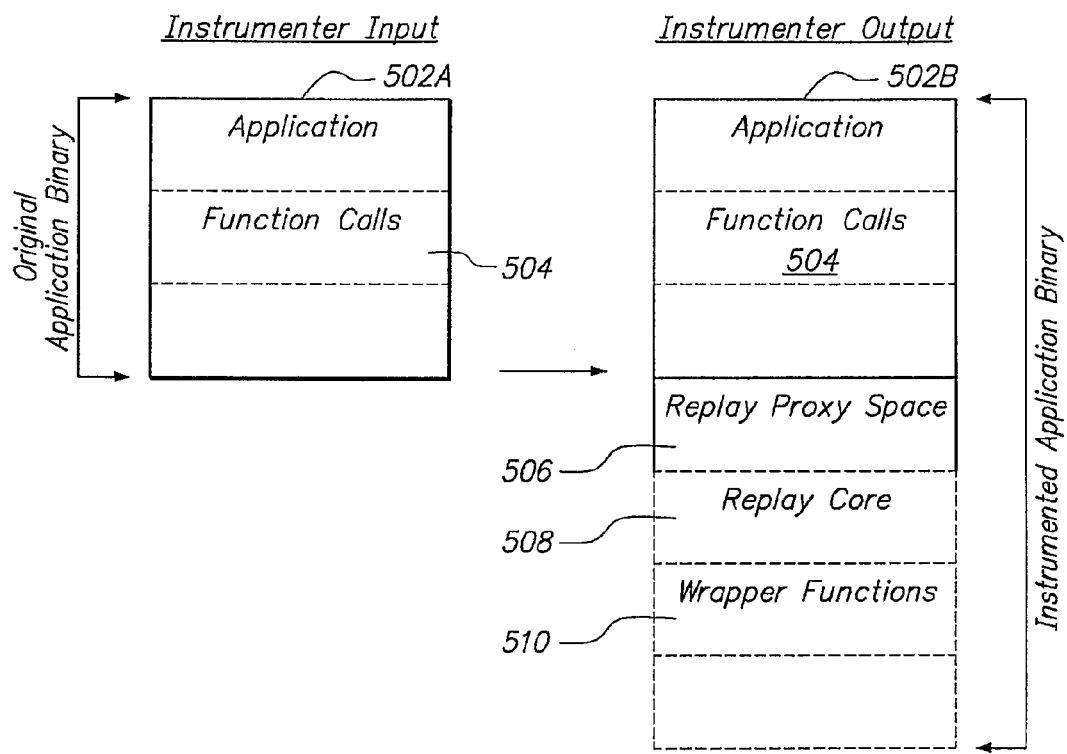
FIG. 5 is a block diagram illustrating transformation of an application binary file into an instrumented application binary file with replay system components.

FIG. 5 is a block diagram illustrating transformation of an application binary file into an instrumented application binary file with replay system components. An original application binary file 502A comprises application code that may include one or more function calls 504. Applying the process of FIG. 4A to original binary file 502A transforms the original binary file to an instrumented binary file 502B that includes a replay proxy space 506, and a replay core 508 having wrapper functions 510.

Replay proxy space 506 includes instructions, such as the instructions of locations 454, 458 of FIG. 4C, that save processor register states, call wrapper functions in the replay core 508, and restore register states. As described above for FIG. 4A, an instrumentation process modifies an application binary file to redirect all nondeterministic calls and instructions first into the appended proxy space 506. The proxy space 506 is used to preserve any state that is specific to the calling code. Such state may consist of registers that must be saved. The proxy call then makes a call into the corresponding function wrapper inside the replay core 508.

Wrapper functions 510 in replay core 508 call system functions on behalf of an application. When the replay system 130 is operating in record mode, replay wrapper functions 510 record all non-deterministic output of the application. Thus, in record mode, the wrapper functions 510 are responsible for recording any nondeterministic data that will be returned by the function inside a replay stream. Further, the wrapper functions 510 implement proxy code for each non-deterministic system method or call that an application may use.

In replay mode, wrapper functions 510 replay non-deterministic output. Wrapper functions 510 also handle asynchronous data updates, and return replayed information to instructions in the proxy space 506 that called the wrapper functions. Thus, in replay mode, the wrapper functions 510 are responsible for writing the same data that was recorded into the output data. The wrapper functions 510 then returns control to the proxy space 506, which restores any state that was saved before entering the wrapper functions. In many cases, the proxy call may be skipped, and the function call can be redirected directly into a wrapper function residing in the replay core 508. This approach is appropriate if no state needs to be preserved or restored, based on the nature of the call.

The replay core 508 also implements miscellaneous functions to support the function wrappers. For example, code in replay core 508 creates and prepares a permanent storage area to save the replay data. In an embodiment, the storage area is accessed using a streaming mechanism. When the storage area is ready, the replay core 508 moves nondeterministic data that is recorded from the function wrappers and writes the data to the streams. The streams may interact with a file system on a hard disk or other medium, or interface with a remote network server on a LAN, WAN or the Internet. Replay core 508 also implements callback managers and other logic to support recording and replaying asynchronous function calls using the approaches described above. Replay core 508 also implements logic for performing thread context switching, interrupt trapping, and other recording and replay functions previously described.

Replay core 508 also implements state recording functions that store type-value pairs for program variables or system variables that represent program state or system state, in association with sync point values representing the time at which a state change occurred. State values are stored only when a state change occurs rather than all state values associated with all method calls of an application. In effect, this approach imposes a throttling effect that reduces the amount of stored data associated with capturing repeated application calls to functions that do not result in any state change.

In replay mode, replay core 508 is configured to open a specified replay data storage file, and then read in the requested nondeterministic data from the stream for the function wrapper. The replay core 508 also is responsible for checking that the application binary is compatible with the selected replay stream.

4.0 Software Development Management Using Replay System 4.1 User Interface Example In an embodiment, the replay system 130 is implemented in a set of program and data files that a developer uses to develop, test or debug applications. In one particular embodiment, described in this section, the replay system 130 is used to develop game applications. This section describes an example installation and user interface mechanism for using an implementation of the replay system 130 with the Microsoft XBOX platform; other embodiments may be implemented, installed and used in a different manner for different platforms. Thus, this section merely presents one example, and is not intended to limit the scope of all possible embodiments.

A set of distribution files comprising replay system 130 is normally placed in a build tree with other third-party tools or APIs that a developer may be using with an XBOX title. For example, the replay system distribution may be stored in a folder named C:/MyTitle/3rdParty/Replay. A user extracts or installs distribution files of replay system 130 to this directory. The user may add the 'Lib' directory to a lib path, and the 'Include' directory to the include path so that the user's compiler can find replay system 130 libraries and include files. Alternatively, the user can use full paths when referencing the libraries and header files.

To record and playback sessions, it is necessary to install replay system 130 on a game title that is under development. In an embodiment, installation comprises:

1. Make the first line of code that the title executes in main( ): ReplayStaticInit( );. This line can be placed in an #ifdef statement with a REPLAY option.
 2. Include 'ReplayLib.h' in the same C or CPP file as main( ). For example: #include "c:/MyTitle/3rdParty/Replay/Include/ReplayLib.h"

If the title is single-player and does not link against XOnline.lib, then statically link against only the following libraries: ReplayCoreModules-Xbox.lib; ReplayCore-Xbox.lib. If the title is multi-player, or links against XOnline.lib, then statically link against only ReplayNetworkModules-Xbox.lib and ReplayCore-Xbox.lib. A title must link against either ReplayNetworkModules-Xbox.lib or ReplayCoreModules-Xbox.lib, but not both at the same time.

3. Edit 'Ini/replay_app_xbox.ini' and change the 'launch_xbe' option to the name of the title's XBE.
 4. Compile the title, and run 'ReplayInstrumenter.exe' on the compiled EXE. The ReplayInstrumenter program performs an instrumentation process on the executable binary file. Instrumentation processes are described further herein in other sections. A sample 'Instrument.bat' file included gives an example of using this command. A copy is reproduced at Table 1A. The developer should edit this script for the title and run it as the last step in the build process.
 5. Create an XBE image normal using the instrumented EXE from the previous step. This is done with the 'imagebld' XBOX utility. Edit the sample 'Instrument.bat' script included with the replay system 130 to automate this step for the title.
 6. Using the 'Instrument.bat' script, deploy the XBE and Replay config files to the XBOX.

TABLE 1A

EXAMPLE INSTRUMENT.BAT FILE

```
@echo off
REM ************************************************************
*
REM
REM This script will instrument your target application with
ReplayDIRECTOR,
REM as well as place config files on the default target Xbox.
REM
REM 'REPLAYDIR' is where Replay files are located.
REM 'TARGETDIR' is the directory containing the target EXE.
REM 'TARGETEXE' is the EXE that will be instrumented. Not a full path,
just the EXE name.
REM 'DESTEXE' is the instrumented EXE location. Specify a full path if
you wish.
```

TABLE 1A-continued

EXAMPLE INSTRUMENT.BAT FILE

```
REM 'DESTXBE' is the XBE image created from the instrumented DESTEXE.
Use a full path.
REM
REM NOTE: This script can be run from any directory.
REM NOTE: '%TARGETDIR%\%TARGETEXE' should point to your target EXEs full
path.
REM
REM
*****************************************************************
*
set LOCALVOL="C:"
set REPLAYDIR=%LOCALVOL%\Projects\ttl\Replay
set XBOXDESTPATH=xe:\ttl\
set TARGETDIR=%LOCALVOL%\Projects\ttl\ttl\code\XBoxRelease
set TARGETEXE=ttl.exe
set DESTEXE=ttl.exe
set DESTXBE=ttlrelease.xbe
echo.
echo.
echo Instrumenting target application with ReplayDIRECTOR...
%REPLAYDIR%\ReplayInstrumenter.exe %TARGETDIR% %TARGETEXE% -out
%DESTEXE% -platform xbox -db %REPLAYDIR% -launch name %DESTXBE% -force -
embedded_config %REPLAYDIR%\Ini\embedded.ini -no_stack_alloc
echo.
echo Building the XBE image. . .
echo.
imagebld /OUT:"%DESTXBE%" /stack:"65536" /nologo /testid: "0x45530018"
/testname:"25-To-Life"  "%DESTEXE%"
echo.
echo Installing XBE and config files on the Xbox. . .
echo.
REM Create the Launcher INI file. . .
echo D:\%DESTXBE% > %REPLAYDIR%\Ini\ReplayLauncher.ini
REM Copy replay files. . .
xbcp /y  "%DESTXBE%"   "%XBOXDESTPATH%\%DESTXBE%"
xbmkdir "%XBOXDESTPATH%\Replay"
xbcp /y  "%REPLAYDIR%\Ini\ReplayLauncher.ini"  "%XBOXDESTPATH%\Replay"
xbcp /y  "%REPLAYDIR%\ReplayLauncher.xbe"
"%XBOXDESTPATH%\zReplayLauncher.xbe"
xbcp /y  "%REPLAYDIR%\ReplayLauncherKeyboard.xbe"
"%XBOXDESTPATH%\zReplayLauncherKeyboard.xbe"
xbcp /ry  "%REPLAYDIR%\Media"   "%XBOXDESTPATH%\Media"
echo.
echo All done!
echo.
```

In one embodiment, the ReplayInstrumenter program of the replay system 130 provides user options for modifying its operation. Generally, ReplayInstrumenter can be run from any directory. The command syntax is: ReplayInstrumenter <app dir><app EXE or INI>\[-out <file>] [-platform <platform>] [-force]. The ReplayInstrumenter has the command line options shown in Table 1B:

TABLE 1B

EXAMPLE COMMAND LINE OPTIONS

| Argument /Option | Description |
| --- | --- |
| <app dir> | The directory where the target application EXE is located. This is usually the output directory. |
| <app EXE or INI> | The filename of the target EXE to be instrumented, without a full path. The instrumenter looks in <app dir> for this file. |
| -out <file> | The destination filename of the instrumented EXE that will be created. This can be a full path. |
| -platform <platform> | This should specify the target platform. (e.g. pc, xbox) |
| -force | This will force the target EXE to be instrumented, even if it appears the destination file is already up-to-date with the target EXE. |

The ReplayInstrumenter must be able to locate the PDB file associated with the target EXE. If the ReplayInstrumenter cannot locate the PDB file, it will display an error indicating where the PDB file should be. Therefore, developers should put the PDB file in the directory indicated by the error message and run the instrumenter again.

By default, replay system 130 records whenever a developer runs a title. Everything is recorded as the game is played, and written to the utility drive. A developer can disable auto-recording by modifying the 'default_record' setting in 'replay_xbox.ini'. If the default recording option is OFF (set to '0'), a user can start a recording session by holding down both triggers and pressing the BLACK button on the controller. This will reboot the XBOX and run the title in recording mode.

Data relating to a session is placed in the 'ReplaySessions' directory located on the Utility Drive. For example: Z:\ReplaySessions\

Replay system 130 saves the last five sessions for each application that is recorded in this directory. Each session is placed in its own directory named '1' through '5'. The most recent session is under a directory named '1'. For example: Z:\ReplaySessions\1

As each new session is recorded, the session number is incremented. '1' will become '2', '2' will become '3', etc. The oldest session, usually '5', will be removed.

To replay a recorded session from the XBOX, the user presses both triggers down while pressing the BACK button. This will replay the most recently recorded session. To replay a recorded session from a debugger (e.g. MSVC), the title is run with the '-replay' command line option. This will replay the most recently recorded session from the debugger. To replay a specific session, the path to the session is specified on the command line with the '-replaySession <SessionDir>' option. For example: myTitle.xbe-replaySession Z:/Replay-Sessions/4

While in replay mode, the replay can be controlled using the XBOX controller with the controls shown in Table 2:

TABLE 2

EXAMPLE REPLAY CONTROLS

| Action | Button |
| --- | --- |
| Pause | Y |
| Play | A |
| Slow Playback Down | X |
| Speed Playback Up | B |
| Reboot to Record Mode | Both Triggers & BLACK |

A user may perform debugging during replay. The replay system 130 does not affect the ability to step through source code in any way. The user can set breakpoints, inspect data and perform any normal debugging functions. Using Visual Studio, the PDB files are valid with replay system 130 installed on the application. At any point during the replaying of a session, a user can attach a debugger such as Visual Studio and step through the source code associated with the application.

A user can save a session by copying or moving the session data from the 'Z:\ReplaySessions' directory. The directories listed herein (e.g., Z:\ReplaySessions\1) each contain a replay session.

Replay sessions can be replayed from the command line, or the debugger, using the following command line parameters. To replay the most recent recorded session: xbreboot <TargetApplication>-replay To replay a specific session located on the XBOX utility drive: xbreboot <TargetApplication>-replay Session \<ReplaySessionDirectory>

For example, to play the most recent recorded session: xbreboot xe:\\myTitle\myTitle.xbe-replay To play any recording on the XBOX utility drive, specify it as: xbreboot xe:\\myTitle\myTitle.xbe-replaySession \ Z:\ReplaySessions\4

In one embodiment, a distribution of replay system 130 includes or uses the files listed in Table 3:

TABLE 3

EXAMPLE DISTRIBUTION FILES

| File | Description |
| --- | --- |
| ReplayInstrumenter.EXE | The instrumenter application that is run to activate the replay system on a title. |
| Instrument.bat | A sample batch file demonstrating how to apply ReplayDIRECTOR to a title. Typically this is run as the last step in a build. |
| Include/ReplayLib.h | Header file that is included to call ReplayStaticInit( ) from main( ). |
| Ini/replay_xbox.ini | Config file containing general Replay options. Generally does not need to be edited. |

TABLE 3-continued

EXAMPLE DISTRIBUTION FILES

| File | Description |
| --- | --- |
| Ini/replay_app_xbox.ini | Config file containing options specific to a title. A user may need to customize these settings for a title. |
| Lib/RepayCore-Xbox.lib | This lib is always statically linked to a title. |
| Lib/ReplayCoreModules-Xbox.lib | This lib is linked for most single-player games. |
| Lib/ReplayNetworkModules-Xbox.lib | This lib is linked for most multi-player and XboxLive games. |
| Z:\ReplaySessions\ (On the XBOX Util Drive) | This is the directory where recorded session data is placed. Each session is stored in a separate directory. Only the five most recent sessions are stored in this directory. |
| Z:\ReplaySavedSessions\ (On the XBOX Util Drive) | This is the directory to store recorded sessions to maintain on long-term basis. A user can place any number of recorded sessions in this directory. |

4.2 Example Bug Communication Process

The approaches herein provide numerous benefits to users. Bugs may be corrected far more rapidly than in prior approaches. The approaches herein also facilitate communicating bugs from one unit of an enterprise to another, such as from a QA team to a development team. One unit can transmit, using e-mail for example, a copy of a replay stream to another unit for replay at that other unit's location.

Figure 8:
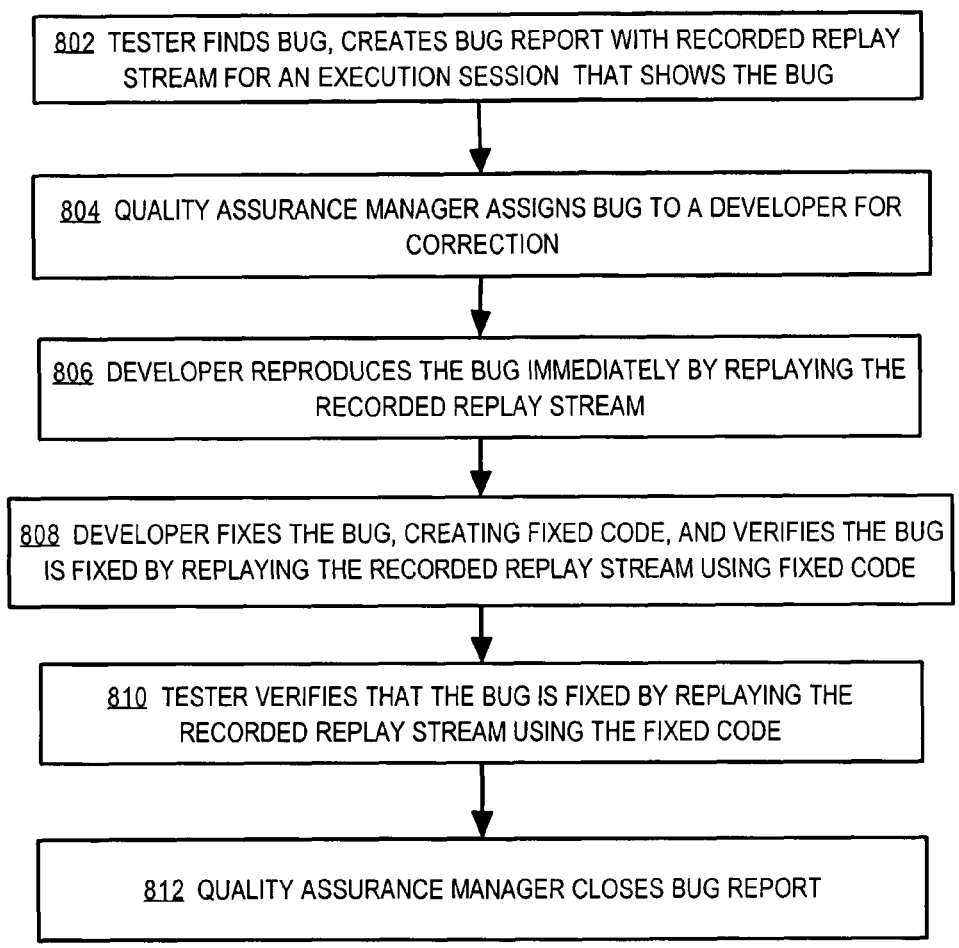
FIG. 8 is a flow diagram of an example software development management process according to an embodiment.

FIG. 8 is a flow diagram of an example software development management process according to an embodiment. In step 802, a software program tester finds a bug in an application program, prepares a recording of program execution that shows the bug using the replay system 130, and creates a bug report in association with a recorded replay stream. In step 804, a quality assurance manager assigns the bug to a developer for correction. Such an assignment can include communicating the bug report with the recorded replay stream. Thus, in the bug report, the tester and QA manager do not have to prepare a detailed description of how to reproduce the bug.

In step 806, the developer reproduces the bug by replaying the recorded replay stream. Step 806 presumes that the developer also runs the replay system to produce an instrumented application binary file that is equivalent to an instrumented binary file that the tester used when the bug was found at step 802. However, by playing the replay stream received with the bug report, the developer can reproduce the bug immediately without having to manipulate the application in a special way or provide particular input.

At step 808, the developer fixes the bug, resulting in creating fixed application code. The developer verifies that the bug is fixed by replaying the recorded replay stream using the fixed code. The developer also may communicate a copy of the fixed application code to the QA manager or tester.

At step 810, the tester verifies that the bug is fixed by replaying the previously recorded replay stream using the fixed code. If the bug is fixed, then replaying the recorded replay stream does not produce the bug. At step 812, the QA manager closes the bug report.

4.3 Other Uses and Benefits

The approaches herein enable performing memory and performance profiling. Because the approaches provide a consistently reproducible run-through of a program, the program can be tested on different platforms that may affect performance, and the approaches help isolate non-deterministic events or platform components that affect performance. For example, developers can repeatedly replay the same execution session while modifying application methods, functions or parameters and can observe the effect of such changes.

The approaches herein can be used to create foolproof demonstrations of computer programs. A user can record a demonstration session with a program at one point in time, and replay the demo later with assurance that the integrity of the demo cannot be affected by variances in input or by human error in running the demo.

The recording system provided herein has little performance impact on a program under test when the program is executing. Performance impact is important, for example, for development of game programs, in which a large amount of video information is generated and smooth, fast refreshing of the video display is essential for a good user experience. An embodiment has been found to result in no noticeable drop in the output frame rate of a typical game program.

No change in the software development workflow process is required; for example, developers do not need to use APIs in developing source code of applications.

Memory usage of embodiments is low. For example, an embodiment implemented on the Microsoft Xbox has been measured to require about 500K to 700K of main memory for execution. Data output of embodiments is also relatively small. For example, an embodiment has been found to generate about 1 MB of replay stream data per minute of program execution. The small, efficiently generated replay stream data files associated with embodiments enable users to conveniently transport replay stream data files to others.

5.0 Memory Management and Thread Management Techniques 5.1 State Synchronization Techniques Computer programs are increasingly developed for use on computer hardware platforms that use multiple processors or processors with multiple cores. Examples include computer game platforms such as PCs, XBox360, and PS3. In these systems and other systems, certain memory write operations may represent non-deterministic state changes that can be recorded and replayed to provide an accurate picture of program execution behavior. Certain memory write operations also may be associated with programmatic "race conditions" in which two or more program execution threads access the same memory location at close to the same time, and one or more of the threads is writing the location.

Accurately replaying a recording of execution of an application program involves ensuring that the application execution path is preserved upon replay precisely and with few exceptions. Detecting the source of an execution path that diverges, upon replay, from a path followed upon recording can be tedious and time-consuming. There may be thousands of sources of such divergence, and the application program may be embedded in a host system such that source code is not available.

In one approach, detecting divergence includes observing the application program making different application function calls or system calls at the time of recording and the time of replay. When a divergence point is identified, a long, manual process is typically used to locate the condition(s) that caused a different execution path. However, these conditions may have occurred millions of instructions earlier in execution, and tracing the divergence path backward to the original location may take an insurmountable amount of backward detection or simulation.

Alternatively, the source of divergence is identified at the earliest possible point by detecting when any state of the application program becomes different. Only different state can cause an application program to execute differently upon replay and recording. Therefore, identifying an initial state difference is an efficient means of detecting divergence, because divergence is detected at the source rather than observing the after-effects of divergence. The state of all application memory is a part of application state.

In an embodiment, these issues are addressed by a replay write exception process that can detect memory write operations that cause state changes, and can assist in identifying race conditions that may be indicated by memory operations of multiple threads occurring close in time.

Figure 11A:
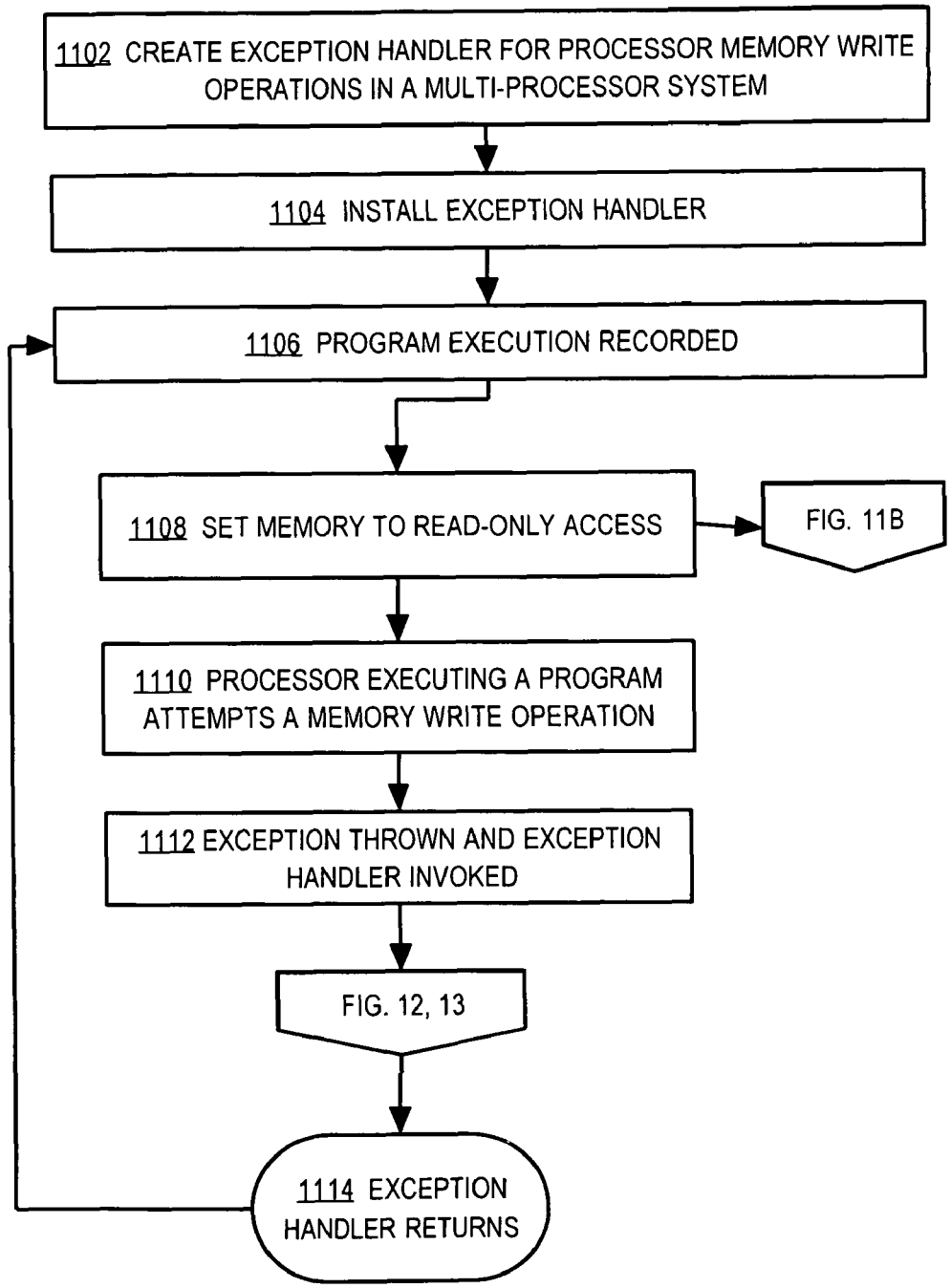
FIG. 11A is a flow diagram of an overview of a write exception process in one example embodiment.

FIG. 11A is a flow diagram of an overview of a write exception process in one embodiment. For purposes of illustrating a clear example, FIG. 11A and the other drawing figures referenced in this section are described with reference to FIG. 1B. However, the general approaches described herein may be used in many other contexts and are not limited to FIG. 1B. In particular, while FIG. 1B illustrates a game binary 140, the approaches herein may be used with any form of application program including applications other than games.

In step 1102, an exception handler for processor memory operations is created. The exception handler is installed at step 1104. At some point thereafter an application program under development, test, debugging or other observation executes and program execution is recorded at step 1106 using the techniques described herein in sections 2 and 3.

At step 1108, a portion of main memory of the computer platform that is under development, test, debugging or other observation is set to read-only access. One technique for setting memory to read-only access is provided in FIG. 11B.

At step 1110, a processor executing an application program attempts a memory write operation. The effect of setting memory to read-only access is that when an application program attempts to perform a write operation on the memory, the computer platform throws a hardware exception at step 1112 that invokes the exception handler that was installed at step 1104. In various embodiments, the approaches of FIG. 12, FIG. 13 can be used to implement an exception handler and perform state synchronization or race condition detection operations. At step 1114, the exception handler returns control. Control transfers to step 1106 at which continued program execution recording occurs at step 1106.

Figure 11B:
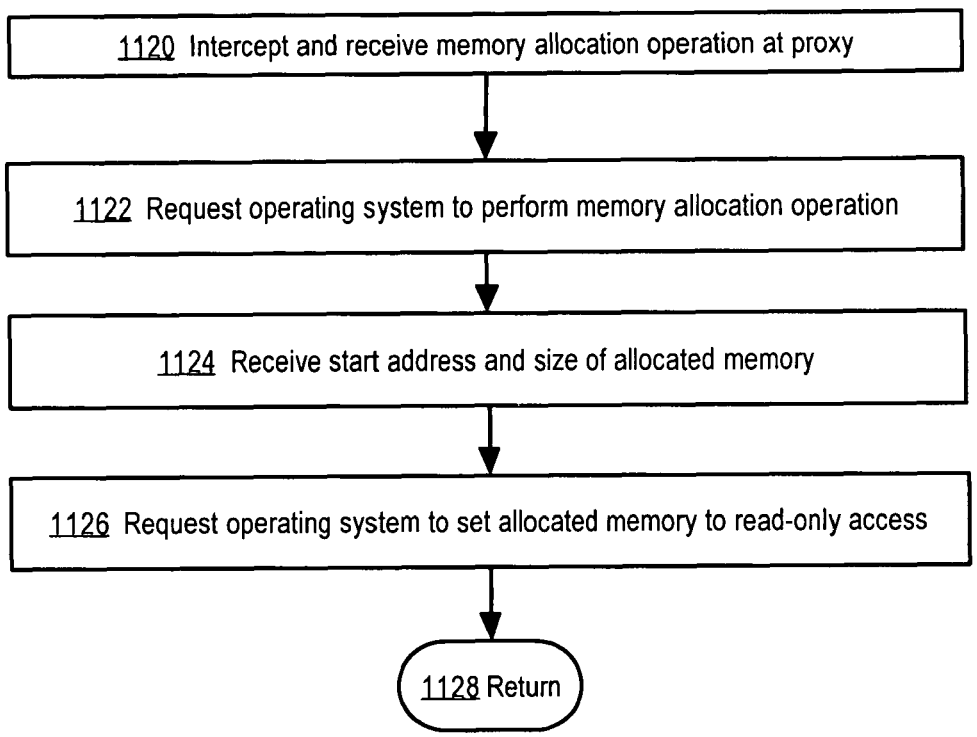
FIG. 11B is a flow diagram of a process of setting memory to read-only access in one example embodiment.

FIG. 11B is a flow diagram of a process of setting memory to read-only access in one example embodiment. In step 1120, a memory allocation operation is intercepted and received. For example, in the arrangement of FIG. 1B, an application program such as game binary 140 executes on kernel/OS 104 and issues a memory allocation instruction that seeks to allocate memory. The instruction may be a "malloc" instruction or a functionally similar instruction in a different instruction set. The memory that is identified in the instruction may be heap memory or static memory in various embodiments. Recording system 130 intercepts the memory allocation instruction, acting as a proxy for the computer system 100.

At step 1122, the operating system is requested to perform a memory allocation operation. The memory allocation operation specifies a requested size or amount of memory to be allocated. For example, an allocation operation could request 1 MB of memory. In an embodiment, recording system 130 executes a memory allocation instruction on processor 102 on behalf of the application program. The processor 102 performs the memory allocation instruction and allocates memory, returning a starting address and a size of the memory that was allocated. Thus, in step 1124, a start address and size of allocated memory is received.

In step 1126, the operating system is requested to set the allocated memory to read-only access. In an embodiment, recording system 130 invokes functions of operating system 104 that set permissions on the allocated memory to read-only access. In step 1128, the process returns control to a calling process. Step 1128 may include returning the start address and size of memory that was allocated. Thus, in an embodiment, the allocated addresses received at step 1124 are returned to the application program so that memory allocation instruction originally attempted by the application program appears to have been performed normally.

In an alternative approach to FIG. 11B, upon startup, recording system 130 scans all virtual address space that is available to the application program on computer system 100. Scanning the virtual address space may be performed using virtual query methods, such as the method VirtualQuery under Microsoft Windows. For each virtual memory segment that is associated with a code module, the virtual pages are made read-only so that writing the pages will generate an exception.

In the alternative approach, after startup, system calls of the application to load in new code segments and static memory are intercepted. When a new module is loaded into application virtual memory, recording system 130 scans each virtual segment and sets the virtual protection permissions to read-only.

Figure 12A:
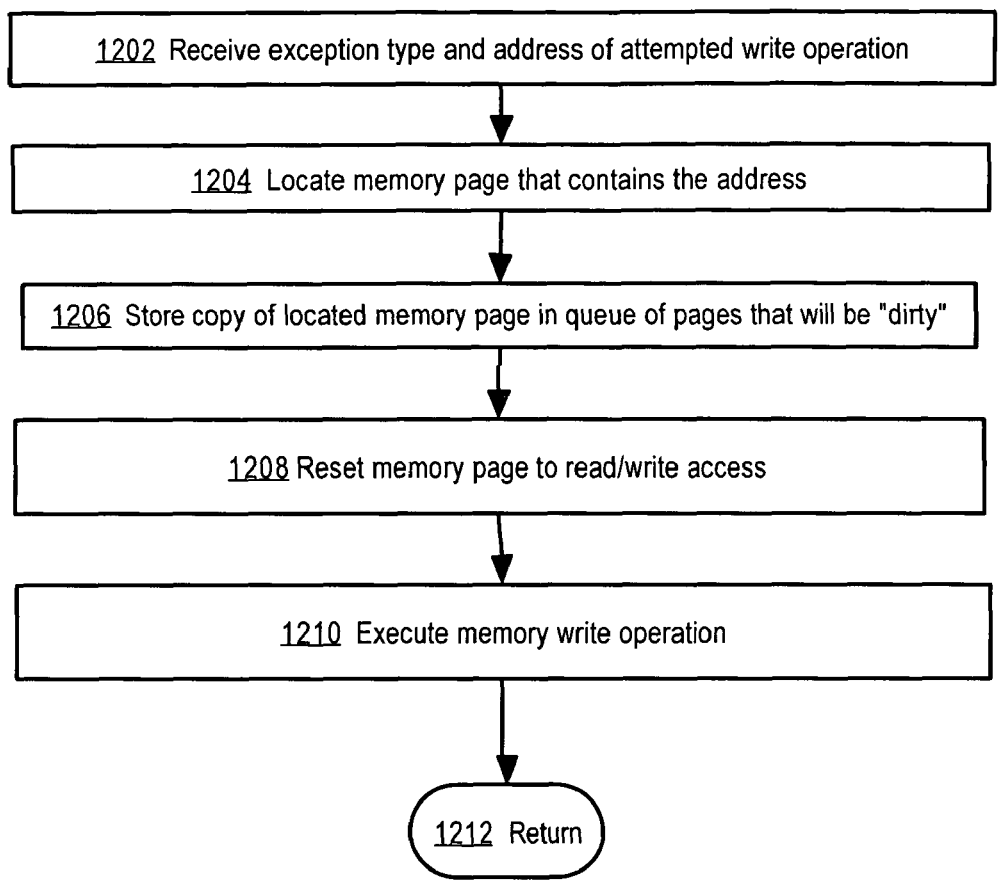
FIG. 12A is a flow diagram of an example exception handler process for use in state synchronization.
Figure 12B:
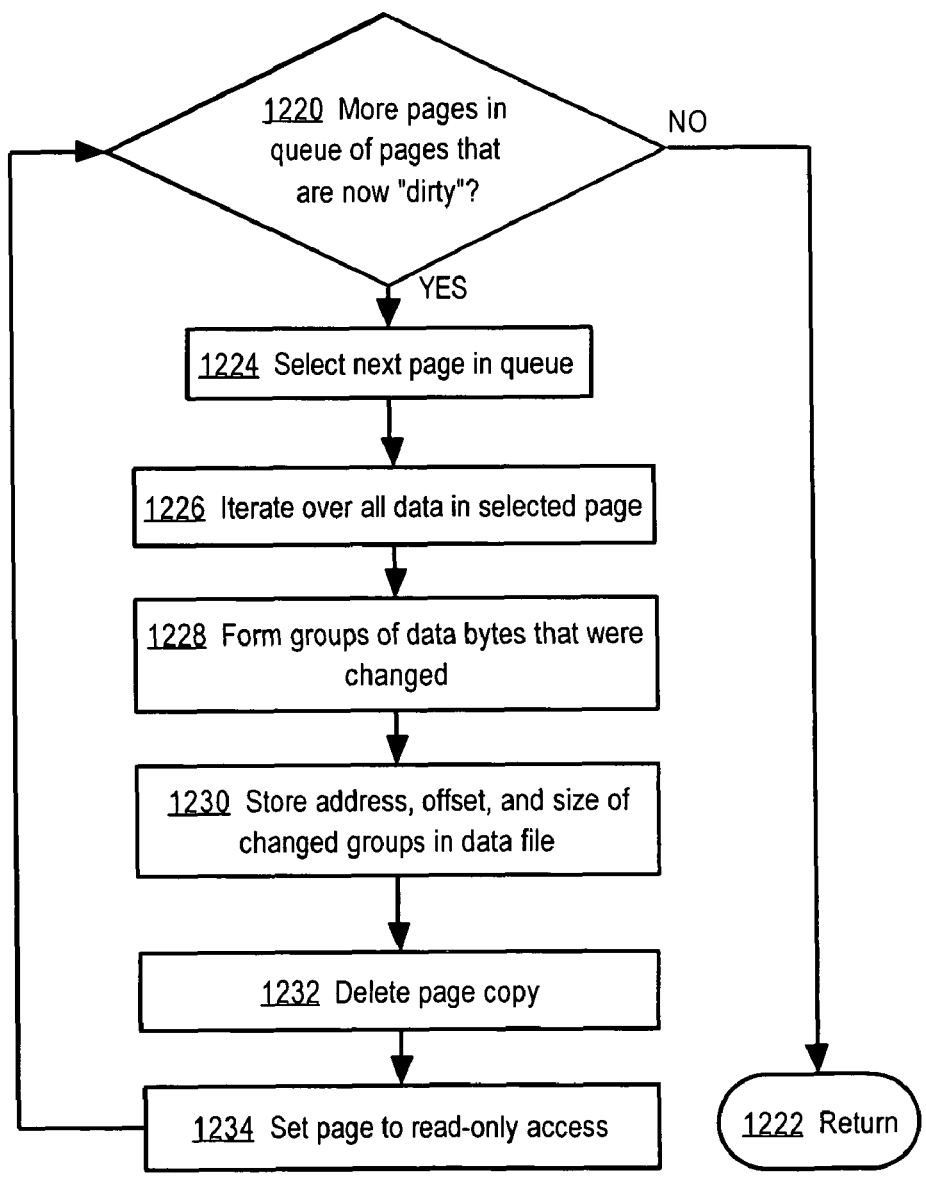
FIG. 12B and FIG. 12C are flow diagrams of an example state synchronization process as performed when recording execution of an application program.
Figure 12C:
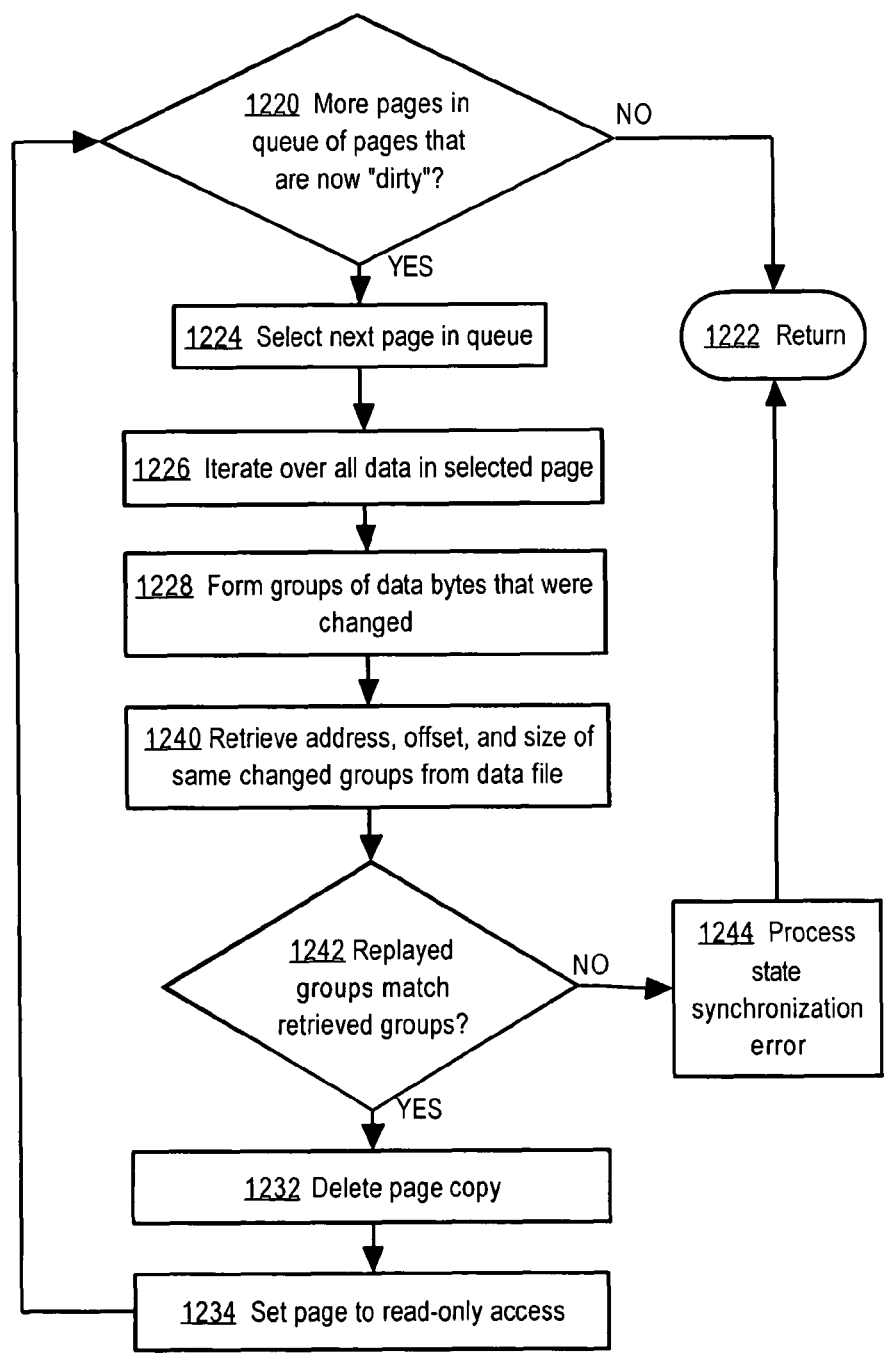

The general approach described above can be applied to ensure that memory state upon replaying the execution of an application program is synchronized to the memory state that existed when execution of the application program was recorded. FIG. 12A is a flow diagram of an example exception handler process for use in state synchronization. FIG. 12B and FIG. 12C are flow diagrams of an example state synchronization process as performed when recording execution of an application program.

In an embodiment for performing state synchronization, the general approach of FIG. 11A is used, and at step 1112 the exception handler of FIG. 12A is invoked. Thus, in one embodiment, an application program such as game binary 140 executes on computer system 100 and recording system 130 monitors execution and records information about the execution in persistent store 136. When the application program attempts a memory allocation operation, recording system 130 uses the process of FIG. 11B to set the allocated memory to read-only access. When the application program attempts to write the allocated memory, processor 102 or OS 104 throws an exception, and the exception handler of FIG. 12A is invoked.

The exception handler of FIG. 12A may be implemented as part of replay core 508 (FIG. 1B).

Referring now to FIG. 12A, in step 1202, the exception handler process receives an exception type and address of memory subject to an attempted write operation. The exception type enables the exception handler to filter out other exceptions that are unrelated to attempted memory write operations. The address indicates what memory location the application program attempted to access.

In step 1204, a memory page that contains the address is located. In an embodiment, to facilitate efficient memory read and copy operations under typical processor instruction sets and computer system architectures, the process operates on memory pages rather than individual addresses. A typical page size is 4 kilobytes. However, alternate embodiments may use individual addresses or memory blocks or segments other than pages when an instruction set or architecture supports reading and writing memory other than pages.

In step 1206, a copy of the located memory page is stored in a queue of pages. Thus, before an attempted memory write operation is allowed to be performed, the state of a page that will be affected by the write operation is saved. Saving the page before the write operation facilitates later evaluation to determine whether the write operation resulted in a non-deterministic state change during program execution. The page may be saved in a queue, list, or any other form of organized data storage. The queue may be referenced as a queue of pages that are known to be altered or "dirty" following the save operation and the write operation. As an alternative to storing a copy of the page, step 1206 may store a representation of the page or an identifier for the page. Examples of a representation or identifier include a checksum, hash, message authentication code, or other unique identifier.

In step 1208, the affected memory page is reset to read-write access so that the requested write operation can be performed without causing another exception. In an embodiment, recording system 130 invokes a function of OS 104 to reset the page to read-write access. In step 1210, the memory write operation is executed, and in step 1212 control returns to the calling process.

In an embodiment, once a block of memory is allocated and pages are stored in the foregoing manner, multiple write operations are allowed on the allocated memory.

Once a set of saved pages is created, other processes may be used during recording and replaying an application program to synchronize the state of memory when the program is replayed to match the state of memory that existed upon recording. In an embodiment, state synchronization processing is performed before and after system callbacks or function calls that occur during recording execution of an application program. Such callbacks usually cause changes in memory state, and such state changes should be synchronized between recording and replaying application program execution. In other embodiments, state synchronization is performed at other times according to a configuration that a user establishes.

Referring now to FIG. 12B, in step 1220, a test determines whether additional pages are present in a queue of pages that are now "dirty." If so, then in step 1224, the next page is selected. Thus, step 1220 represents iterating through all pages that were previously stored in the process of FIG. 12A and performing the successive steps in each iteration for each stored page.

In step 1226, all data that is currently in memory in the same page is examined. Thus, step 1226 involves comparing all data in the saved copy of a page to all data in that same page as it currently exists in memory, typically after one or more write operations have altered the page. Step 1228 forms groups of data bytes that were changed as a result of the write operations. The groups of bytes formed at step 1228 may consist of a list of addresses, offsets, and sizes. In a system that uses 32-bit addressing, the groups of bytes may comprise 4-byte chunks.

In step 1230, the address, offset, and size of changed groups of bytes are stored in a data file or other persistent storage of a recording system, such as in persistent store 136. The address, offset, and size values may be stored in serialized form to facilitate transfer of the information across a network or to other computer systems or applications. In an embodiment, for compactness, the actual data bytes are not stored, but only reference information is stored, such as address, offset and size. As a result, recording system 130 acquires a record of exactly which parts of memory were altered during program execution at the time that the program execution was recorded. In an alternate embodiment, the actual modified bytes could be stored.

In step 1232, the saved page copy is deleted because it is no longer needed. In step 1234, the page of the running computer system is again set to read-only access. Resetting the page to read-only access enables the recording system to capture subsequent changes to the same page by repeating the processes of FIG. 11A, FIG. 12A, FIG. 12B.

The process of FIG. 12C is performed when the execution of an application is replayed, to determine whether the state of memory upon replay matches the state of memory that existed when the execution of the application was earlier recorded.

Steps 1220-1228 correspond to FIG. 12B and are performed in the same manner described above. However, after a change is detected and represented in the form of groups of bytes at step 1228, in step 1240 and step 1242 the process of FIG. 12B searches the storage of the recording system to determine whether matching groups of bytes are represented in the storage. Generally, steps 1240-1242 involve determining whether the address, offset, and size of a group of changed bytes that is recognized during replay matches stored values that were captured during earlier recording of the application program.

If a matching group is found, then the state of memory at the time of replay is synchronized to the state of memory at the time of previous recording. In response, in step 1232 the saved page copy is deleted since it is no longer needed for comparison purposes, and the page is reset to read-only access to permit evaluation of subsequent changes.

If no matching group is found in storage, then the state of memory at the time of replay is different than the state of memory at the time of previous recording. In response, in step 1244 a state synchronization error is processed.

In an embodiment, step 1244 involves invoking a debugger for debugging the application program and setting a debugger breakpoint at the location in program execution at which step 1220 was invoked. For this purpose, step 1220 or another step may involve saving an instruction location at which FIG. 12C is invoked. Typically the breakpoint is set at or near an invocation of a callback or API function call.

A user can then search the program instructions to identify callbacks or function calls that caused the state synchronization error. Normally the search will be limited to a relatively small range of program instructions. Thus, in the approach herein a user is placed within the debugger at a location of the application program far closer to a likely source of a synchronization problem than in prior approaches. The approach herein allows detection of application program bugs far closer in the execution flow to a place where a bug actually exists, for example, at an API call, rather than thousands or millions of instructions later.

The embodiments described above address state changes in static memory and application heap memory. Additionally or alternatively, state changes in stack memory may be detected. In an embodiment, when a system call is entered, the recording system moves down the arguments of a function to the next memory page. The entire stack space above the new page is protected in the manner described above. As a result, changes in stack state can be detected during system calls, which is when loss of state synchronization is likely to occur.

In a further alternative or enhancement to the foregoing approaches, stack space addresses are preserved. In an embodiment, precise state synchronization is achieved by maintaining stack addresses on all threads between recording and replaying. As a result, execution decisions that are based on the stack addresses will proceed during replay exactly as they did during recording.

In an embodiment, recording system 130 upon recording and replaying gives the same deterministic stack space for all threads that an application program 140 creates to execute within. In an embodiment, operating system 104 provides this feature as a core function. Alternatively, recording system 130 uses a deterministic memory allocating function to generate addresses at recording and replaying time.

In an embodiment, when a new thread is about to execute, recording system 130 allocates memory space and moves the stack pointer to the top address of the new memory. Moving the stack pointer to the top address is performed on platforms, such as Microsoft Windows PCs, in which stack addresses grow downward; in other platforms the stack pointer may be moved to the bottom address or a first address. Special thread local variables that correspond to the old stack address are adjusted. Examples include variables that point to the current frame exception handler and minimum and maximum thread pointers.

When a thread has completed execution, recording system 130 detects the completion but does not allow the thread to immediately exit normally. Recording system 130 restores the stack pointer and all special thread local variables to their original values. Recording system 130 then allows the thread exit to occur.

5.2 Detecting Race Conditions in a Program

An application program running on a multi-threaded or multi-processor platform has a race condition when two or more program execution threads attempt to access a shared resource at close to the same time. For example, a race condition exists when two threads attempt to access the same memory location at about the same time, and one or both threads is writing the location. Since the write operation changes the state of the memory, a race condition is problematic because subsequent program execution may differ depending on which thread wins a "race" to write the memory location. Subsequent execution may differ because subsequent read operations may yield different results depending on which thread won the "race" and wrote the memory location first. Race conditions can cause undefined program behavior or program crashes.

Figure 13A:
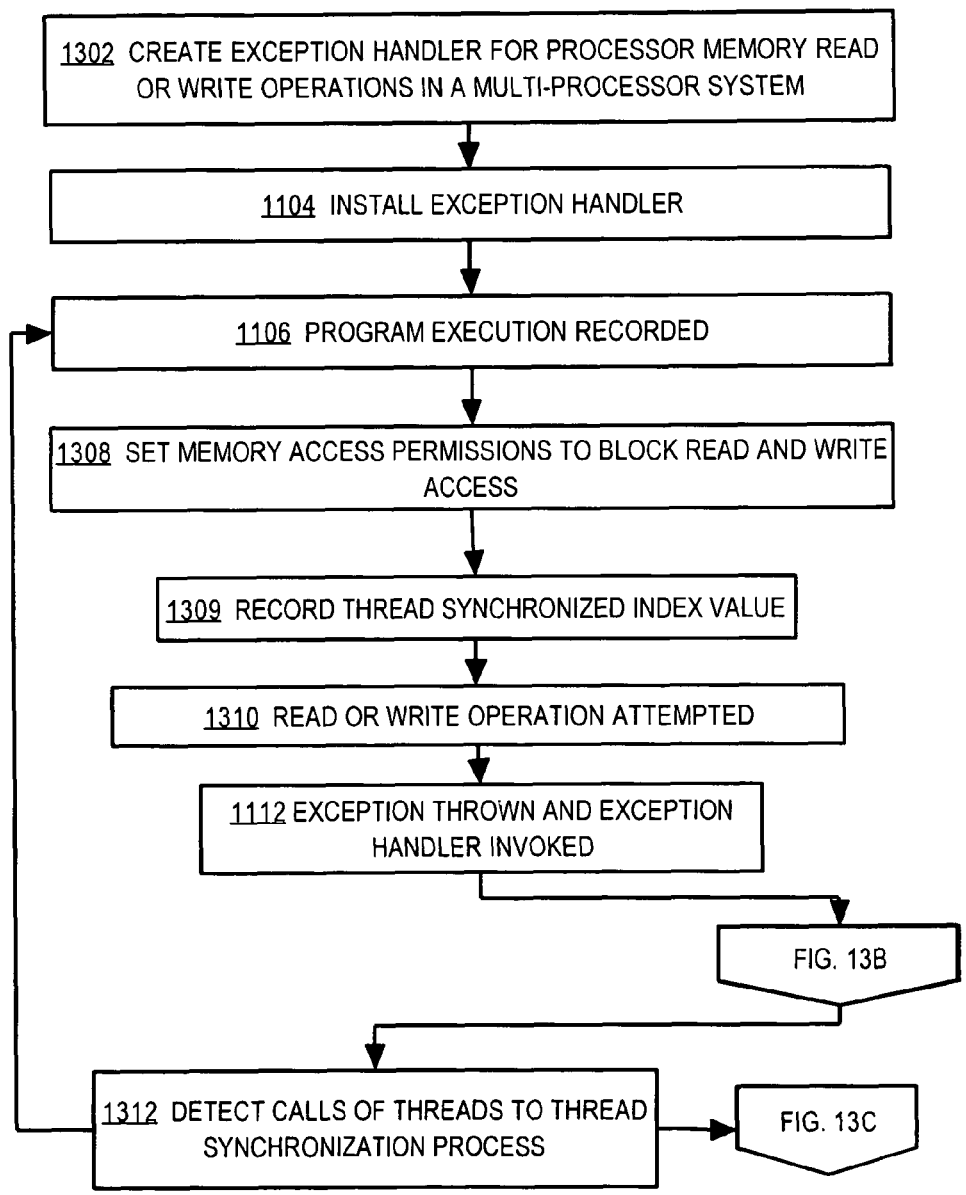
FIG. 13A is a flow diagram of a process of detecting race conditions in an embodiment.

FIG. 13A is a flow diagram of a process of detecting race conditions in an embodiment. In step 1302, an exception handler for processor memory read and write operations is created. Unlike the process of FIG. 11A, step 1302 involves creating an exception handler that can process exceptions relating to both read and write operations. In step 1104 the exception handler is installed as in FIG. 11A, and program execution is recorded at step 1106.

In step 1308, memory access permissions are set to block read access and write access. A process similar to FIG. 11B may be used, in which memory allocation operations are intercepted and operating system functions are used to set memory to block both read access and write access.

In step 1309, a thread synchronized index value is recorded.

In step 1310, a processor executing a program attempts a memory read operation or write operation. In an embodiment, an application program running on computer system 100 attempts to read or write a program variable or other memory element. In response, computer system 100 throws an exception at step 1112 and invokes the exception handler that was installed at step 1104.

Figure 13B:
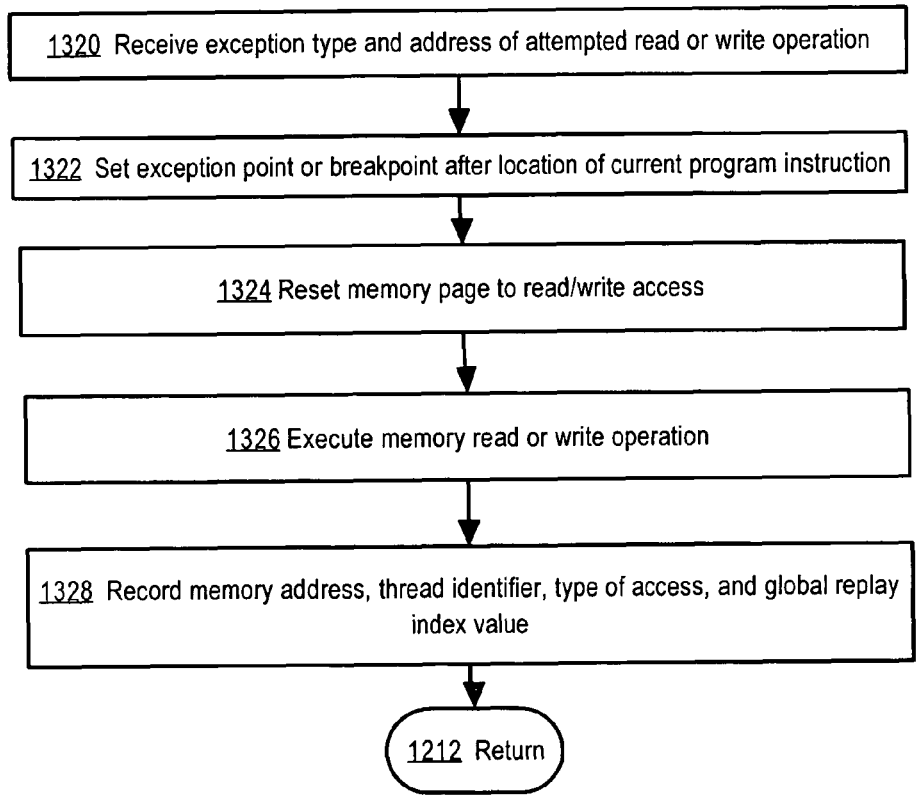
FIG. 13B is a flow diagram of a process of performing an exception handler for detecting race conditions in an embodiment.

FIG. 13B is a flow diagram of a process of performing an exception handler for detecting race conditions in an embodiment. At step 1320, the exception handler receives an exception type and an address of an attempted read operation or write operation that resulted in an exception at step 1112 of FIG. 13A. At step 1322, an exception point or breakpoint is set for a point after the location of the current executing program instruction that caused the exception. Step 1322 may involve storing the instruction location in persistent store 136. Storing the exception point enables the process to track where a race condition may exist within an application program.

At step 1324, permissions for a memory page that contains the address involved in the attempted read operation or write operation are reset to allow both read access and write access. In step 1326, the attempted memory read operation or write operation is executed.

In step 1328, the process makes a record of the memory address involved in the read operation or write operation, an identifier of the thread performing the operation, the type of access such as read or write, and a global replay index value. In an embodiment, the term "global replay index value" is equivalent to "sync index" as used herein, and represents a location within an execution path of the application program that is being recorded. The global replay index value may, but is not required to, correlate to an instruction in the application program. In an embodiment, the information of step 1328 is stored in a database table in which each row or record represents a memory access and columns store the address, thread identifier, access type, and global replay index value.

At step 1212 the process of FIG. 13B returns control to a calling process, e.g., FIG. 13A. The result of FIG. 13B is that program execution is briefly interrupted in order to record information about a point in program execution that may represent a race condition. The information recorded at step 1328 can be recorded rapidly without substantially interrupting real time execution of a program for which execution is being recorded. The information recorded at step 1328 can be later analyzed to determine whether a race condition is present. An example of analysis is described below for FIG. 14.

Figure 13C:
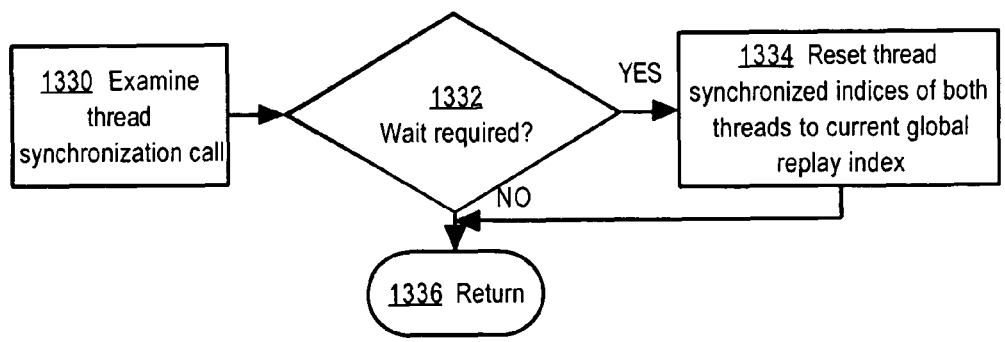
FIG. 13C is a flow diagram of a process of synchronizing thread indices.
Figure 15:
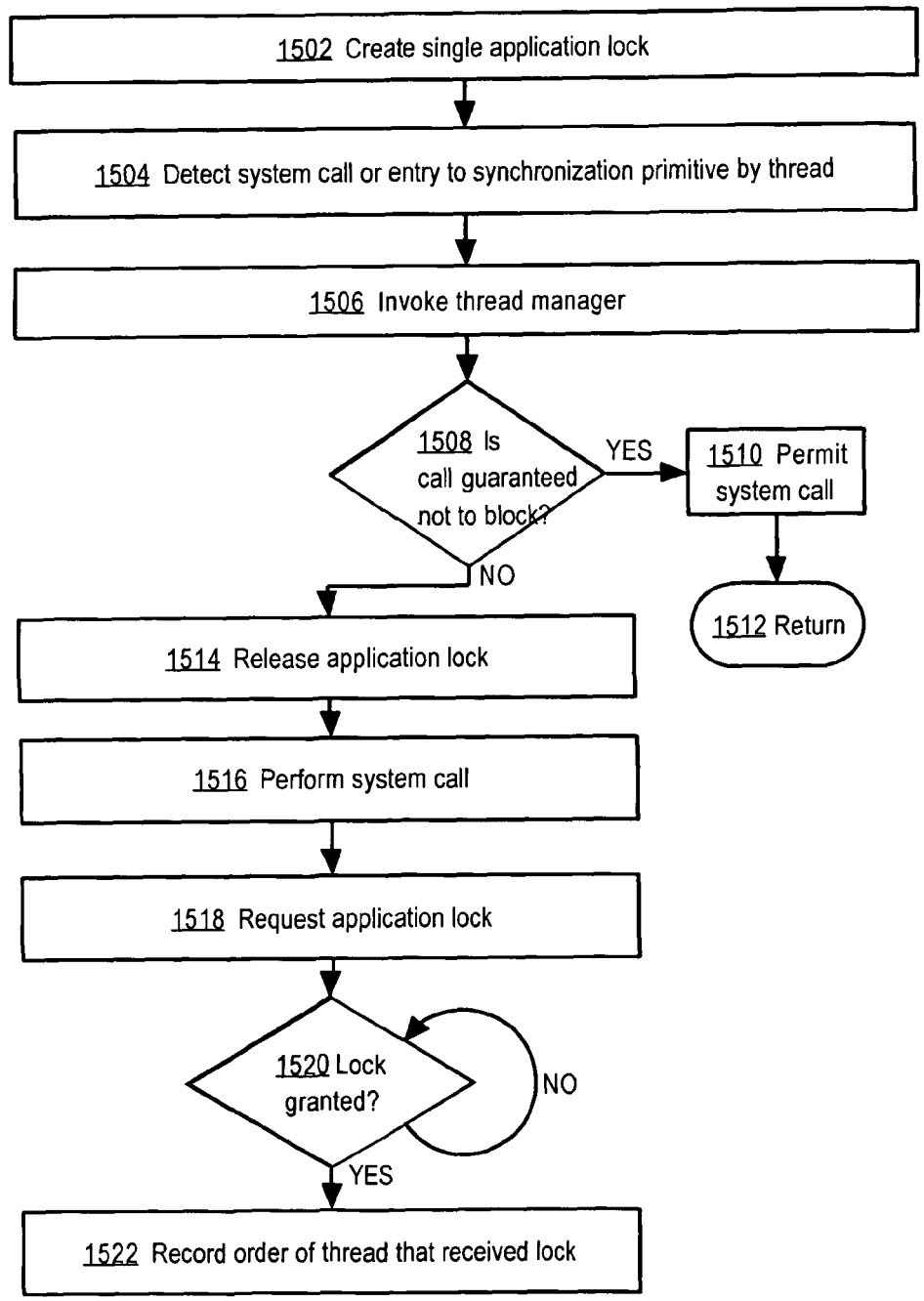
FIG. 15 is a flow diagram of one embodiment of a process of managing application threads to prevent race conditions.
Figure 16:
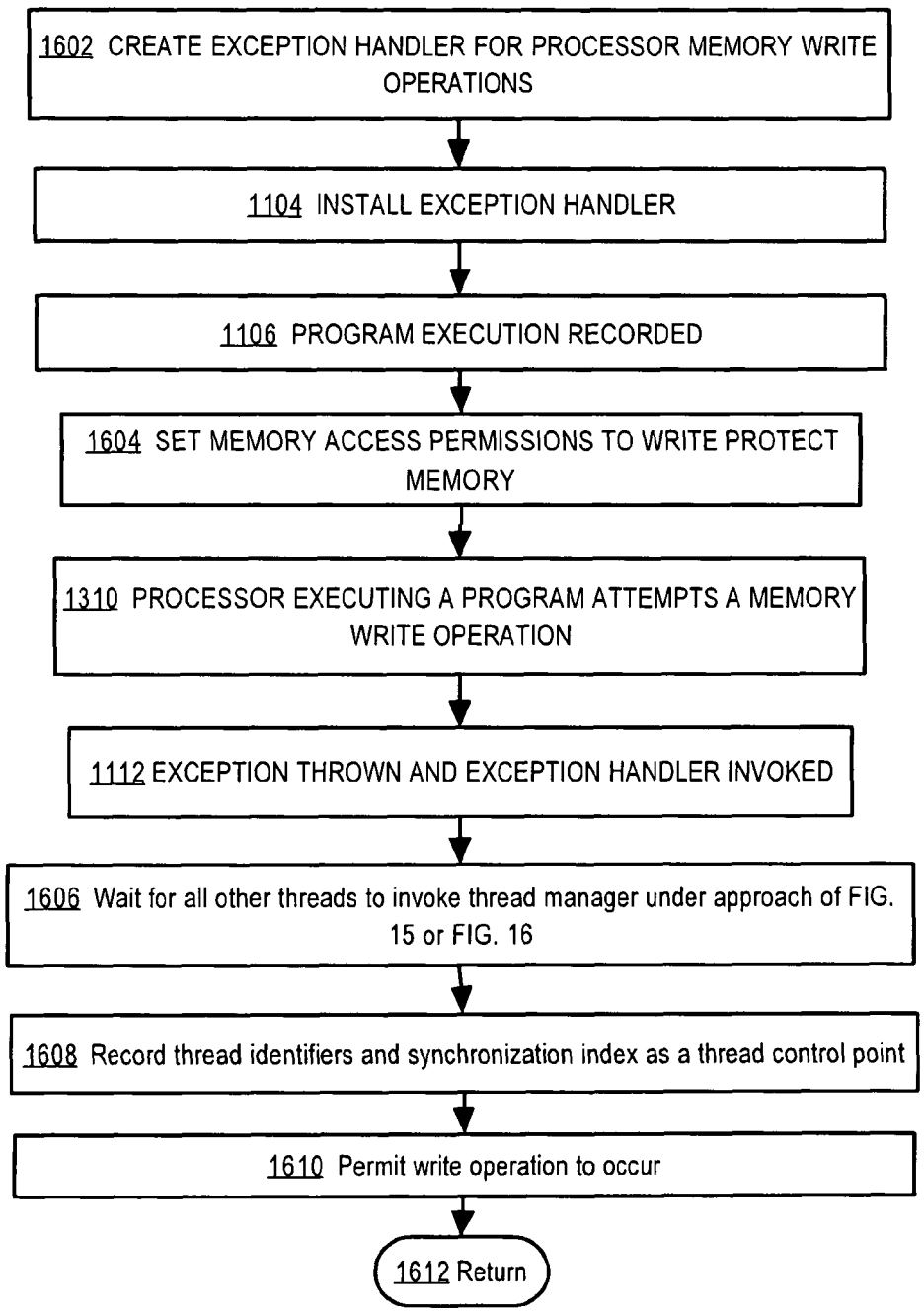
FIG. 16 is a flow diagram of one embodiment of performing thread synchronization in connection with memory state changes.

Referring again to FIG. 13A, at step 1312, calls of threads to a thread synchronization process are detected and processed at FIG. 13C. The calls can comprise invocations of a thread manager under the conditions described herein with respect to FIG. 15 or FIG. 16. The use of the thread synchronization processes of FIG. 15, FIG. 16 is described further below. Generally, a thread invokes a thread synchronization call when the potential for conflict with another thread exists.

FIG. 13C is a flow diagram of a process of synchronizing thread indices. At step 1330 the thread synchronization call is examined. If the call is of a type that may require one thread to wait on another thread, then in step 1334, the thread synchronized indices of both threads are reset to the current global replay index. If no wait is indicated, then no action is taken on the index values. Control returns at step 1336.

Figure 14:
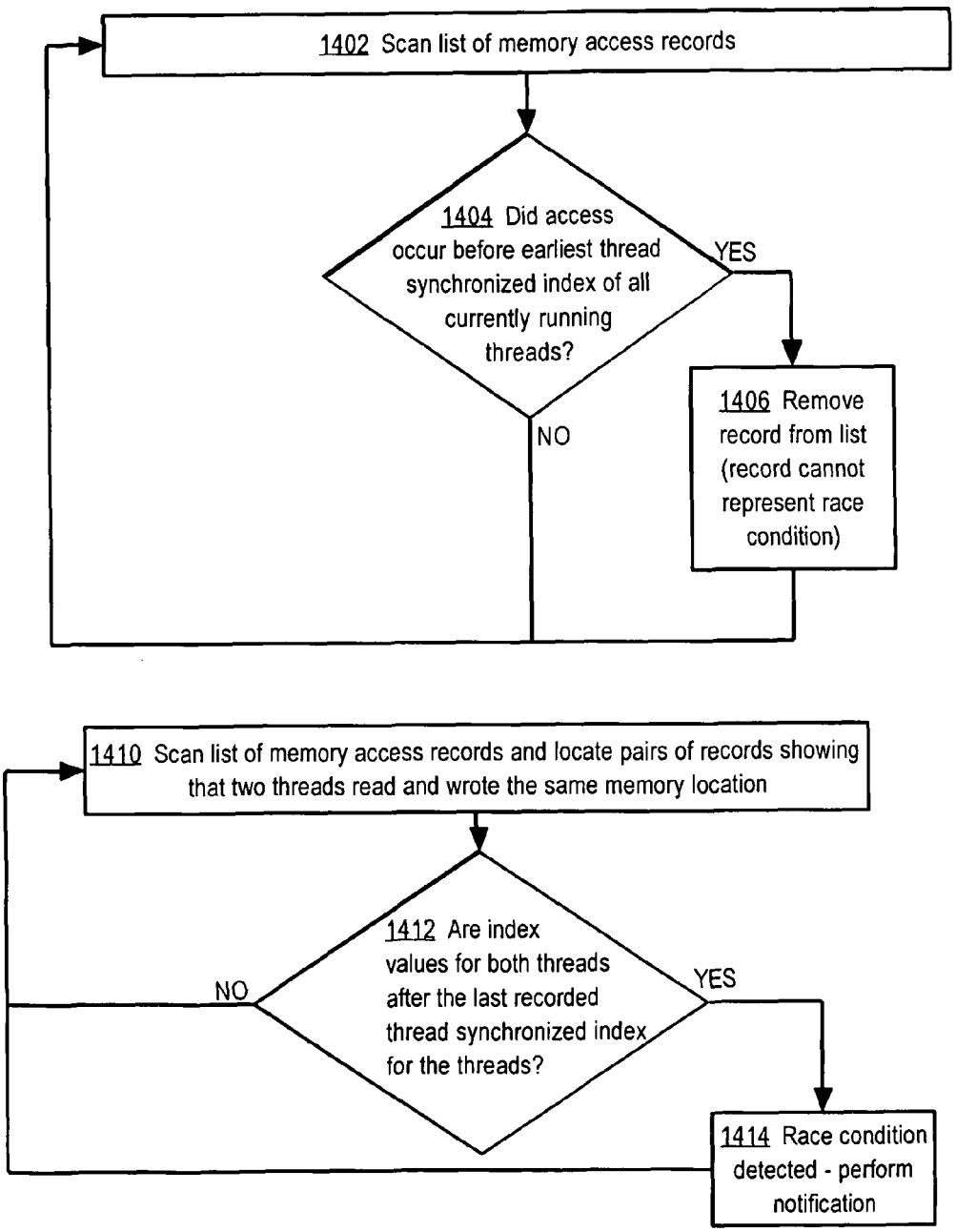
FIG. 14 is a flow diagram of an example process for evaluating records of memory accesses to determine whether race conditions exist.

FIG. 14 is a flow diagram of two example processes for evaluating records of memory accesses to determine whether race conditions exist. In an embodiment, in step 1402 a list of memory access records is scanned. The list of memory access records may comprise records that associate the information stored at step 1328 of FIG. 13B.

In step 1404, a test is performed to determine whether a particular memory access occurred before the earliest thread synchronized index value of all currently running threads. If so, then the record is removed from storage at step 1406, because that record cannot represent a race condition. Such a record represents a memory access that is not near in time to another memory access for the same location performed by another thread.

Additionally, starting at step 1410 the memory access records may be scanned to locate pairs of records showing that two threads read and wrote the same memory location. In an embodiment, the database table column that stores an accessed address is used as a sorting key to group records that accessed the same location.

At step 1412, the process tests whether the global replay index values for both threads are after the last recorded thread synchronized index value for the threads. If so, then a race condition has been detected, and user notification is performed at step 1414. A race condition has been detected because the test indicates that two threads performed potentially conflicting write operations on the same memory operation close in time and after the threads were last known to be in synchronization.

User notification at step 1414 may comprise any of a plurality of processes. For example, an alert message may be displayed or dispatched, or a debugger can be launched and set to the breakpoint of step 1322 (FIG. 13B).

5.3 Race Condition-Proof Thread Management Techniques

In prior approaches, application programs seek to avoid race conditions by using operating system mechanisms such as semaphores. In an embodiment, thread management techniques are provided to prevent application programs from having race conditions.

In one approach termed a serialized approach, one execution thread is allowed to run at a time during recording an application program, guaranteeing that no race conditions can occur. A developer can still write the application program as a multi-threaded application, but during recording of program execution, the application runs in a single-threaded serialized mode. In the serialized approach, an application-level lock is defined. A thread of the program must acquire the lock in order to run. Recording system 130 manages granting the lock to prevent deadlocking.

In a second approach termed a parallel approach, application program threads are allowed to run in parallel. Further, the general approach of FIG. 11A is used, and a thread handling exception handler is invoked upon a memory write exception. When the exception handler is invoked, the recording system enters serialized mode and permits only one thread to execute at a time based on granting a lock. When all other threads reach a specified control point, serialized mode ends and all threads are again permitted to run in parallel. The parallel approach permits fast execution while guaranteeing that race conditions cannot occur.

In this context, a control point refers to a system call or memory write exception that the recording system 130 intercepts during recording or replaying application program execution.

FIG. 15 is a flow diagram of one embodiment of a process of managing application threads to prevent race conditions. The general approach of FIG. 15 is to provide an application lock. To execute, a thread must hold the application lock, and only one lock is available per application. When an application enters a system call, the lock is released. Upon replay, all thread and process synchronization primitives of the operating system are simulated. Actual system calls to such primitives are not made during replay, because such calls may be incorrect based on timing or external influences.

In step 1502, a single application-level lock is created and acquired by a thread. In step 1504, an attempt by a thread of the application program 140 to perform a system call or enter a synchronization primitive is detected and in step 1506 a thread manager is invoked in response.

In an embodiment, detection of calls at step 1504 and multithreaded replay are supported using an exception handler approach. In this embodiment, all static memory and heap memory associated with an application is protected against write operations. An exception handler is installed. When a memory write exception occurs, the exception handler is invoked. In an embodiment, the exception handler comprises a singleton thread manager object that controls all threads known to the application or entering the application. Each time a thread is about to enter a system call or enter a synchronization primitive that may block the thread, the thread calls an "execute" method of the thread manager object, or the exception handler calls the "execute" method.

Subsequent steps of FIG. 15 may be implemented in the "execute" method for processing attempts to enter system calls. FIG. 16, described further below, illustrates steps for processing memory write exceptions.

In step 1508, a test is performed to determine if the system call is guaranteed not to block another thread. For example, critical application code sections, semaphores and other synchronization primitives may have calls that query their status without blocking other threads. If the system call is guaranteed not to block another thread, then in step 1510 the system call is permitted without releasing the application lock, and control returns at step 1512.

If a system call could cause a blocking condition, then in step 1514 the application lock is released. As a result, other potentially blocked threads can execute in parallel, providing desirable performance gains. In step 1516, the system call is permitted or performed. In step 1518, the application lock is requested and must be acquired, as tested at step 1520, before any subsequent application code is executed.

At step 1518-1520 the application lock could be acquired by any of several threads that are executing in parallel. Once the lock is acquired, at step 1522 a record is stored to identify the order of the threads that acquired the lock. The record may include the control point. As a result, upon replaying program execution, the same order may be replicated. In an embodiment, the thread manager object enforces replaying thread lock acquisition in the same order.

FIG. 16 is a flow diagram of one embodiment of performing thread synchronization in connection with memory state changes. In step 1602, an exception handler that can process memory write operations is created. In step 1104, the exception handler is installed and in step 1106 application program execution is recorded as in FIG. 11A. In step 1604, memory access permissions for application memory are set to write-protect the memory. Static and heap memory may be protected in this manner.

In step 1310, a processor executing the application program attempts a memory write operation. Because the memory is write protected, the attempted write operation causes the processor to throw an exception and an exception handler is invoked in step 1112.

As part of the exception handler, at step 1606 the write operation is not immediately performed but instead the thread is required to wait for all other application threads to invoke the thread manager under either the approach of FIG. 15 (when the threads attempt system calls) or FIG. 16 (when the threads attempt memory write operations). For example, when all threads have invoked the thread manager object under these conditions, then all threads have reached a point of synchronization in application program execution. Accordingly, in step 1608 a record is stored indicating the thread identifiers of all threads and including a synchronization index value as a thread control point in association with the thread identifiers. Thus, a control point is represented as a synchronization index value, which may comprise the then-current value of the global synchronization index.

In step 1610, the write operation is permitted to occur, and in step 1612 control returns. Thereafter all threads can execute in parallel until one thread again attempts an operation that requires synchronization. As a result, application program execution proceeds without race conditions, and conflict points of threads are recorded so that later playback can control execution of threads in the same order and without race conditions.

In one alternative, a semaphore obtained using calls to the operating system may be used to prevent high-priority threads from a causing a deadlock.

5.4 Detecting Memory Operations

The preceding sections describe detecting when an application program performs a memory read operation or memory write operation using memory protection and exception handling techniques. In alternative embodiments, detecting memory operations may be performed in other ways. For example, in one embodiment recording system 130 detects kernel calls that relate to memory read operations or memory write operations, and determines whether state synchronization exists or race conditions are present using processing other than exception handling. Thus, the broad approach herein involves detecting memory read operations or memory write operations and performing responsive processing to detect state synchronization or race conditions, but the use of memory protection and exception handlers is not required.

In one approach, a software module that resides in kernel space, as opposed to user space, has the ability to monitor memory accesses made by one or more applications running in user space. This approach may be used with any operating system, such as Linux for which the kernel is open source and accessible. Alternatively, the approach may be used with virtual machines such as Java or.NET. By monitoring access to the kernel memory manager, all memory accesses made by one or more applications can be tracked and analyzed.

In another approach, a customized replacement memory management component is installed at the kernel level, and is responsible for all memory creation and destruction, and allows control of memory accesses. The custom memory management component may act as a layer between the standard kernel memory manager and user space that provides an opportunity to exercise control over memory access. This system would control all memory accesses made by one or more applications.

In another approach, a hardware module such as a customized memory management processor can send notifications when memory access occurs. The module sends data including the memory address accessed, the type of access, and which hardware thread is accessing the memory. The data may also include the contents of the access in the case of a write, or the scope of the access in the case of a read or execute. The module would provide all data necessary to detect race conditions as well as perform other recording and playback functions. The hardware module can be implemented using modified standard memory management processors.

6.0 Implementation Mechanisms—Hardware Overview

Figure 9:
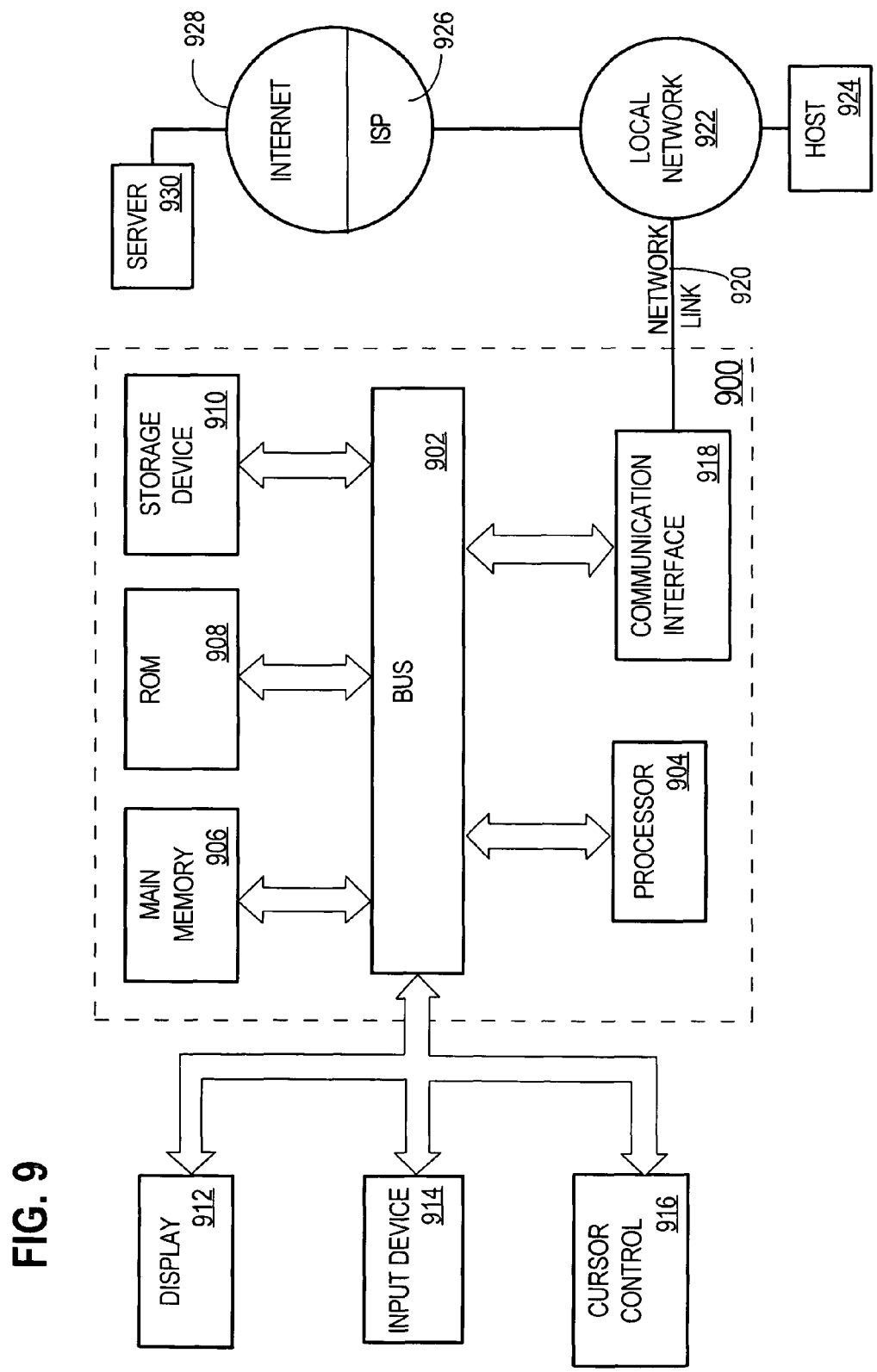
FIG. 9 is a block diagram that illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for recording and replaying computer programs. According to one embodiment of the invention, recording and replaying computer programs is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for recording and replaying computer programs as described herein.

The received code may be executed by processor 904 as it is received, and/or stored in storage device 910, or other non-volatile storage for later execution. In this manner, computer system 900 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:
1. A computer-implemented method, comprising:
during a replay execution of an application program in a computer system, receiving a memory allocation request from the application program;
requesting the computer system to allocate memory;
intercepting an operation of the application program to write the allocated memory;
storing a copy of at least a portion of the allocated memory;
permitting one or more operations to write the allocated memory, resulting in written memory;
comparing the written memory to the stored copy; and
in response to determining that changes made to the allocated memory during the replay execution are different than previously recorded changes captured and stored during a recorded execution of the application program, generating a notification that a memory state synchronization exception occurred;
wherein the recorded execution and the replay execution are separate executions of the application program.

2. The method of claim 1, further comprising installing an exception handler that the computer system invokes when a memory write exception occurs, wherein the exception handler performs the storing and permitting.

3. The method of claim 1, further comprising requesting the computer system to set an allocated memory to allow only read operations.

4. The method of claim 1, wherein generating a notification comprises generating a notification that a memory state synchronization exception occurred at a point in executing the program associated with the request to write.

5. The method of claim 1, wherein the memory comprises any of: static memory in the computer system, and heap memory in the computer system.

6. The method of claim 1, further comprising requesting the operating system to permit reading and writing the allocated memory after the storing.

7. The method of claim 1, wherein the storing further comprises storing a current execution location in association with the copy.

8. The method of claim 1, wherein generating a notification comprises setting a debugger breakpoint at the point of execution, and invoking a debugger at the debugger breakpoint.

9. The method of claim 1, further comprising selecting one or more groups of bytes in the written memory at which the written memory is different than the stored copy, and storing information identifying the groups of bytes in a recording of execution of the program.

10. The method of claim 1, further comprising, after the comparing, deleting the copy and requesting the operating system to set the allocated memory for read-only access again.

11. The method of claim 1, wherein the computer system is a computer game platform.

12. The method of claim 1, wherein storing a copy of at least a portion of the allocated memory comprises storing a copy of a page of allocated memory.

13. The method of claim 1, wherein storing a copy of at least a portion of the allocated memory comprises storing any of a checksum, hash, message authentication code, and a unique identifier of the allocated memory.

14. A computer-implemented method, comprising:
during a replay execution of an application program in a computer system,
detecting an operation of the application program to write a memory;
preventing the operation to write the memory;
storing a copy of at least a portion of the memory;
permitting one or more operations to write the memory, resulting in written memory;
comparing the written memory to the stored copy; and
in response to determining that changes made to the memory during the replay execution are different than previously recorded changes captured and stored during a recorded execution of the application program, generating a notification that a memory state synchronization exception occurred;
wherein the recorded execution and the replay execution are separate executions of the application program.

15. A non-transitory computer-readable medium carrying computer program instructions which when executed by one or more processors cause the one or more processors to carry out the steps of:
during a replay execution of an application program in a computer system,
receiving a memory allocation request from the application program;
requesting the computer system to allocate memory;
intercepting an operation of the application program to write an allocated memory;
storing a copy of at least a portion of the allocated memory;
permitting one or more operations to write the allocated memory, resulting in written memory;
comparing the written memory to the stored copy; and
in response to determining that changes made to the allocated memory during the replay execution are different than previously recorded changes captured and stored during a recorded execution of the application program, generating a notification that a memory state synchronization exception occurred;
wherein the recorded execution and the replay execution are separate executions of the application program.

16. The non-transitory computer-readable medium of claim 15, further comprising instructions which when executed cause the one or more processors to perform installing an exception handler that the computer system invokes when a memory write exception occurs, wherein the exception handler performs the storing and permitting.

17. The non-transitory computer-readable medium of claim 15, further comprising instructions which when executed cause the one or more processors to perform requesting the computer system to set an allocated memory to allow only read operations.

18. The non-transitory computer-readable medium of claim 15, wherein the instructions for generating a notification comprises instructions which when executed cause the one or more processors to perform generating a notification that a memory state synchronization exception occurred at a point in executing the program associated with the request to write.

19. The non-transitory computer-readable medium of claim 15, wherein the memory comprises any of: static memory in the computer system, and heap memory in the computer system.

20. The non-transitory computer-readable medium of claim 15, further comprising instructions which when executed cause the one or more processors to perform requesting the operating system to permit reading and writing the allocated memory after the storing.

21. The non-transitory computer-readable medium of claim 15, wherein the instructions for storing further comprise instructions which when executed cause the one or more processors to perform storing a current execution location in association with the copy.

22. The non-transitory computer-readable medium of claim 15, wherein the instructions for generating a notification comprise instructions which when executed cause the one or more processors to perform setting a debugger breakpoint at the point of execution, and invoking a debugger at the debugger breakpoint.

23. The non-transitory computer-readable medium of claim 15, further comprising instructions which when executed cause the one or more processors to perform selecting one or more groups of bytes in the written memory at which the written memory is different than the stored copy, and storing information identifying the groups of bytes in a recording of execution of the program.

24. The non-transitory computer-readable medium of claim 15, further comprising instructions which when executed cause the one or more processors to perform, after the comparing, deleting the copy and requesting the operating system to set the allocated memory for read-only access again.

25. The non-transitory computer-readable medium of claim 15, wherein the computer system is a computer game platform.

26. The non-transitory computer-readable medium of claim 15, wherein the instructions for storing a copy of at least a portion of the allocated memory comprise instructions which when executed cause the one or more processors to perform storing a copy of a page of allocated memory.

27. The non-transitory computer-readable medium of claim 15, wherein the instructions for storing a copy of at least a portion of the allocated memory comprise instructions which when executed cause the one or more processors to perform storing any of a checksum, hash, message authentication code, and a unique identifier of the allocated memory.

* * * * *